United States Patent
Akiba et al.

(10) Patent No.: US 7,372,578 B2
(45) Date of Patent: *May 13, 2008

(54) OPTICAL IMAGE MEASURING APPARATUS

(75) Inventors: Masahiro Akiba, Yamagata (JP);
Kinpui Chan, Yamagata (JP);
Yasufumi Fukuma, Tokyo (JP);
Hiroyuki Otsuka, Tokyo (JP); Hisashi Tsukada, Tokyo (JP); Kazuhiko Yumikake, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 11/223,928

(22) Filed: Sep. 13, 2005

(65) Prior Publication Data

US 2006/0055939 A1    Mar. 16, 2006

(30) Foreign Application Priority Data

Sep. 15, 2004  (JP) ................ 2004-268830

(51) Int. Cl.
G02B 9/02  (2006.01)
(52) U.S. Cl. .................... 356/495; 356/497
(58) Field of Classification Search ........ 356/484–485, 356/489–497, 479
See application file for complete search history.

(56) References Cited

U.S. PATENT DOCUMENTS 3,772,457 A * 11/1973 Macovski ............... 348/163

(Continued)

FOREIGN PATENT DOCUMENTS

JP    3245135    10/2001

JP    2001-330558    11/2001

(Continued)

OTHER PUBLICATIONS

Masahiro Akiba et al.: "Real-Time, Micrometer Depth-Resolved Imaging by Low-Coherence Reflectometry and a Two-Dimensional Heterodyne Detection Technique," *Japanese Journal of Applied Physics*, vol. 39, No. 11B, Nov. 15, 2000, pp. L1194-L1196.

(Continued)

*Primary Examiner*—Tarifur R Chowdhury
(74) *Attorney, Agent, or Firm*—Edwards Angell Palmer & Dodge LLP

(57) ABSTRACT

Provided is an optical image measuring apparatus capable of effectively receiving interference light, particularly an alternating current component thereof using a smaller number of photo sensors. The optical image measuring apparatus includes a polarizing plate for converting a light beam from a broad-band light source to linearly polarized light, a half mirror for dividing the light beam into signal light and reference light, a piezoelectric element for vibrating a reference mirror, a wavelength plate for converting the reference light to circularly polarized light, a polarization beam splitter for extracting two different polarized light components from interference light produced from the signal light and the reference light which are superimposed on each other by the half mirror, CCDs for detecting the two different polarized light components, and a signal processing portion for producing an image of an object to be measured based on the detected polarized light components. A frequency for intensity modulation of the light beam is synchronized with a beat frequency of the interference light. A frequency of vibration of the reference mirror is synchronized with the beat frequency of the interference light and an amplitude of vibration thereof is set to be equal to or smaller than a wavelength of the interference light.

26 Claims, 9 Drawing Sheets

U.S. PATENT DOCUMENTS

| | | | | |
|---|---|---|---|---|
| 5,491,552 A | * | 2/1996 | Knuttel | 356/495 |
| 6,304,325 B1 | * | 10/2001 | Hardy et al. | 356/450 |
| 6,741,356 B1 | * | 5/2004 | Ishiwata et al. | 356/491 |
| 7,245,383 B2 | * | 7/2007 | Chan et al. | 356/497 |
| 2006/0072118 A1 | * | 4/2006 | Chan et al. | 356/495 |

OTHER PUBLICATIONS

N. Tanno; "The imaging technic of the optical coherence tomography and its application to living organism image;" *Kogaku* (*Japanese Journal of Optics*); vol. 28; No. 3; 1999; pp. 116-125./ Discussed in specification.

T. Nakajima; "Principle and application of the optical heterodyne method;" *Optical Heterodyne Technology*; 2003; pp. 1-10 and Cover page (7 Sheets total).

K.P. Chan, et al; "Micrometre-resolution, optical imaging of objects through highly scattered media using a heterodyne detector array;" *Electronics Letters*; vol. 30; No. 21; Oct. 13, 1994; pp. 1753-1754./ Discussed in the specification.

* cited by examiner

OPTICAL IMAGE MEASURING APPARATUS

BACKGROUND OF THE INVENTION

1. Field of the Invention

The present invention relates to an optical image measuring apparatus for applying a light beam to an object to be measured, particularly a light scattering medium, and for measuring a surface form or inner form of the object to be measured by receiving a reflected light beam or a transmitted light beam to produce an image of a measured form. In particular, the present invention relates to an optical image measuring apparatus for measuring the surface form or inner form of the object to be measured by using an optical heterodyne detection method to produce the image of the measured form.

2. Description of the Related Art

In recent years, attention has been given to an optical image measuring technique for producing an image of a surface or inner portion of an object to be measured using a laser light source or the like. This optical image measuring technique is not hazardous to human bodies in contrast to a conventional X-ray CT. Therefore, the development of applications in the medical field has been particularly expected.

An example of a typical method in the optical image measuring technique is a low coherent interference method (also called an optical coherence tomography or the like). This method uses the low coherence of a broad-band light source having a broad spectral width, such as a super luminescent diode (SLD). According to the method, reflection light from an object to be measured or light transmitted therethrough can be detected at superior distance resolution on the order of μm (for example, see Naohiro Tanno, "Kogaku" (Japanese Journal of Optics), Volume 28, No. 3, 116 (1999)).

FIG. 8 shows a basic structure of a conventional optical image measuring apparatus based on a Michelson interferometer, as an example of an apparatus using the low coherent interference method. An optical image measuring apparatus 200 includes a broad-band light source 201, a mirror 202, a beam splitter 203, and a photo detector 204. An object to be measured 205 is made of a scattering medium. A light beam from the broad-band light source 201 is divided by the beamsplitter 203 into two, that is, reference light R propagating to the mirror 202 and signal light S propagating to the object to be measured 205. The reference light R is light reflected by the beam splitter 203. The signal light S is light transmitted through the beam splitter 203.

Here, as shown in FIG. 8, a propagating direction of the signal light S is set as a z-axis direction and a plane orthogonal to the propagating direction of the signal light S is defined as an x-y plane. The mirror 202 is shiftable in a direction indicated by a double-headed arrow in FIG. 8 (z-scanning direction).

The reference light R is subjected to Doppler frequency shift through z-scanning when reflected by the mirror 202. On the other hand, the signal light S is reflected on a surface of the object to be measured 205 and inner layers thereof when the object to be measured 205 is irradiated with the signal light S. The object to be measured 205 is made of the scattering medium, so reflection light of the signal light S may be a diffusing wave having random phases including multiples cattering. The signal light propagating through the object to be measured 205 and the reference light that propagates through the mirror 202 to be subjected to the frequency shift are superimposed on each other by the beam splitter 203 to produce interference light.

In the image measurement using such a low coherent interference method, a difference in optical path length between the signal light S and the reference light R is within a coherence length (coherent distance) on the order of μm of the light source. In addition, only a component of the signal light S which has phase correlation to the reference light R interferes with the reference light R. That is, only a coherent signal light component of the signal light S selectively interferes with the reference light R. Based on such fundamentals, the position of the mirror 202 is shifted by the z-scanning to change the optical path length of the reference light R, so that a light reflection profile of the inner layers of the object to be measured 205 is measured. The object to be measured 105 is also scanned with the irradiated signal light S in an x-y plane direction. The interference light is detected by the photo detector 204 during such scanning in the z-direction and the x-y plane direction. An electrical signal (heterodyne signal) outputted as a detection result is analyzed to obtain a two-dimensional sectional image of the object to be measured 205 (see Naohiro Tanno, "Kogaku" (Japanese Journal of Optics), Volume 28, No. 3, 116 (1999)).

Assume that an intensity of the reference light R and an intensity of the signal light S which are superimposed by the beam splitter 203 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, see Yoshizawa and Seta "Optical Heterodyne Technology (revised edition)", New Technology Communications (2003), p.2).

Expression (1)

$$i(t) \propto I_r + I_s + 2\sqrt{I_r I_s} \cos(2\pi f_{if} t + \Delta\theta) \qquad (1)$$

The third term of the right side of the expression (1) indicates an alternating current electrical signal and the frequency f if thereof is equal to a frequency of beat caused from the interference between the reference light R and the signal light S. The frequency $f_{if}$ of an alternating current component of the heterodyne signal is called a beat frequency or the like. The first and second terms of the right side of the expression (1) indicate direct current components of the heterodyne signal and correspond to a signal intensity of background light of interference light.

However, when the two-dimensional sectional image is obtained by the conventional low coherent interference method, it is necessary to scan the object to be measured 205 with a light beam and to successively detect reflection light waves from respective regions of the object to be measured 205 in a depth direction (z-direction) and a sectional direction (x-y plane direction). Therefore, the measurement of the object to be measured 205 requires a long time. In addition, it is hard to shorten a measurement time in view of measurement fundamentals.

In views of such problems, an optical image measuring apparatus for shortening a measurement time has been proposed. FIG. 9 shows a fundamental structure of an example of such an apparatus. As shown in FIG. 9, an optical image measuring apparatus 300 includes abroad-band light source 301, a mirror 302, a beam splitter 303, a two-dimensional photo sensor array 304 serving as a photo detector, and lenses 306 and 307. A light beam emitted from the light source 301 is converted into a parallel light flux by the lenses 306 and 307 and a beam diameter thereof is widened thereby. Then, the parallel light flux is divided into two, that is, the reference light R and the signal light S by the beam splitter 303. The reference light R is subjected to Doppler frequency shift through z-scanning with the mirror 302. On the other hand, the signal light S is incident on the object to be measured 305 over a broad area of the x-y plane because the beam diameter is widened. Therefore, the signal light S becomes reflection light including information related to the surface and inner portion of the object to be measured 305 in the incident area. The reference light R and the signal light S are superimposed on each other by the beam splitter 303 and detected by elements (photo sensors) arranged in parallel on the two-dimensional photo sensor array 304. Thus, it is possible to obtain a two-dimensional sectional image of the object to be measured 305 in real time without light beam scanning.

An apparatus described in K. P. Chan, M. Yamada, and H. Inaba, "Electronics Letters", Vol. 30, 1753 (1994) has been known as such a non-scanning type optical image measuring apparatus. In the apparatus described in the same document, a plurality of juxtaposed heterodyne signals outputted from a two-dimensional photo sensor array are inputted to signal processing systems arranged in parallel to detect the amplitude and phase of each of the heterodyne signals.

However, in such a constitution when the spatial resolution of an image is increased, it is necessary to increase a number of elements of the array. In addition, it is necessary to prepare a signal processing system including a number of channels corresponding to the number of elements. Therefore, it is supposedly hard to actually use the apparatus in fields that require a high resolution image, such as a medical field and an industrial field.

Thus, the inventors of the present invention have proposed the following non-scanning type optical image measuring apparatus in JP 2001-330558 A (claims and specification paragraphs [0044] and [0072] to [0077]). The optical image measuring apparatus according to this proposal includes a light source for emitting a light beam, an interference optical system, and a signal processing portion. In the interference optical system, the light beam emitted from the light source is divided into two, that is, signal light propagating through an examined object arrangement position in which an object to be examined is arranged and reference light propagating on an optical path different from an optical path passing through the examined object arrangement position. The signal light propagating through the examined object arrangement position and the reference light propagating on the different optical path are superimposed on each other to produce interference light. The optical interference system includes a frequency shifter, light cutoff devices, and photo sensors. The frequency shifter shifts a frequency of the signal light and a frequency of the reference light relative to each other. In order to receive the interference light in the optical interference system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of detection elements which are spatially arranged and separately detect the interference light pulse trains. The signal processing portion combines the plurality of interference signals obtained by the photo sensors to generate signals of the signal light which correspond to respective points of interest of a surface or inner layers of the object to be examined which is arranged in the examined object arrangement position along the propagation path of the signal light.

In the optical image measuring apparatus, the interference light in which the reference light and the signal light interfere with each other is divided into two parts. The two parts of the interference light are received by the two photo sensors (two-dimensional photo sensor arrays) and respectively sampled by the light cutoff devices (shutters) disposed in front of both sensor arrays. A phase difference of $\pi/2$ is set between sampling periods of the two divided parts of the interference light. Therefore, an intensity of the signal light and an intensity of the reference light which compose background light of the interference light and phase quadrature components (sine component and cosine component) of the interference light are detected. In addition, an intensity of the background light included in outputs from both the sensor arrays is subtracted from the outputs of both the sensor arrays to calculate two phase quadrature components of the interference light. An amplitude of the interference light is obtained based on the calculation result.

However, according to the optical image measuring apparatus described in JP 2001-330558 A (claims, specification paragraphs [0068] to [0084], and FIG. 1), the sampling frequency of the interference light is not automatically set, so the setting takes an effort. In addition, a sampling frequency corresponding to a beat frequency cannot be easily set in the optical image measuring apparatus described in Japanese Patent Application Number 2001-330558, so it is difficult to perform high-precision sampling with ease.

An optical image measuring apparatus for detecting interference light using three photo sensors has been proposed in, for example, Japanese Patent Application 2004-52195 by the inventors of the present invention. In view of a reduction in manufacturing cost and simplification of the structure, it may be desirable to perform the same measurement, particularly, alternating current component measurement using a small number of photo sensors.

An available image sensor such as a charge-coupled device (CCD) camera has been widely used for the two-dimensional photo sensor array of the optical image measuring apparatus as described above. However, up to now, a problem has been recognized that a currently available CCD camera cannot follow the beat frequency of a heterodyne signal which is on the order of several kHz to several MHz because of the low frequency response characteristic thereof. The feature of the optical image measuring apparatus which is proposed by the inventors of the present invention and described in JP 2001-330558 A is to perform the measurement using the low frequency response characteristic based on the sufficient understanding of the problem.

SUMMARY OF THE INVENTION

The present invention has been made in view of the above-mentioned circumstances. An object of the present invention is to provide an optical image measuring apparatus capable of effectively receiving interference light, particularly an alternating current component thereof using a smaller number of photo sensors.

Another object of the present invention is to provide an optical image measuring apparatus capable of easily sampling the interference light with high precision.

To achieve the above objects, according to a first aspect of the present invention, there is provided an optical image measuring apparatus, including: light beam outputting means for outputting a light beam whose intensity is periodically modulated; a first converting means for converting a polarization characteristic of the light beam to a linear polarization; dividing means for dividing the light beam into signal light propagating through an object to be measured and reference light propagating through a reference object; vibrating means for vibrating the reference object at-a predetermined frequency with a predetermined amplitude; a second converting means for converting a polarization characteristic of one of the signal light and the reference light, which is linearly polarized light; superimposing means for superimposing the signal light propagating through the object to be measured and the reference light propagating through the reference object to be vibrated on each other to produce interference light, the signal light and the reference light respectively having a polarization characteristic converted by the first converting means and the second converting means; extracting means for extracting two different polarized light components from the produced interference light by the superimposing means; two detecting means for detecting the two different polarized light components that have been extracted from the first interference; and signal processing means for calculating one of a signal intensity and a phase of the interference light based on the polarized light components detected by the two detecting means to form an image of the object to be measured, in which the predetermined frequency related to vibration of the reference object which is caused by the vibrating means is synchronized with the frequency of the interference light, and the predetermined amplitude of the vibration is set to be equal to or smaller than the wavelength of the interference light. Note that the frequency of the interference light indicates a beat frequency of the interference light (same as above).

According to a second aspect of the present invention, there is provided an optical image measuring apparatus, including: a light source for emitting a light beam; dividing means for dividing the emitted light beam into signal light propagating through an object to be measured and reference light propagating through a reference object; vibrating means for vibrating the reference object at a predetermined frequency with a predetermined amplitude; superimposing means for superimposing the signal light which has propagated through the object to be measured and the reference light which has propagated through the reference object on each other to produce interference light; optical path dividing means for dividing an optical path of the produced interference light into two optical paths; two intensity modulating means for periodically modulating intensities of interference light beams propagating on the optical paths at a predetermined frequency; two detecting means for detecting the interference light beams whose intensities are modulated by the two intensity modulating means and which propagate on the optical paths; and signal processing means for calculating one of a signal intensity and a phase of each of the interference light beams detected by the two detecting means to form an image of the object to be measured, in which the predetermined frequency for intensity modulation of the interference light beams which is performed by the two intensity modulating means is synchronized with a frequency of the interference light, and the predetermined frequency related to vibration of the reference object which is caused by the vibrating means is synchronized with the frequency of the interference light and the predetermined amplitude of the vibration is set to be equal to or smaller than a wavelength of the interference light.

According to a third to fourth aspect of the present invention, there is provided an optical image measuring apparatus according to the first or second aspect of the invention, in which the vibrating means includes a piezoelectric element bonded to the reference object.

According to a fifth to eighth aspect of the present invention, there is provided an optical image measuring apparatus according to any one of the first to fourth aspects of the invention, further including: a laser light source for outputting laser light; an interference optical system for dividing the outputted laser light into first laser light propagating through the reference object vibrated by the vibrating means and second laser light propagating through a reflecting mirror which is fixedly located and superimposing the first laser light which has propagated through the reference object and the second laser light which has reflected on the reflecting mirror on each other to produce assistant interference light; assistant detection means for detecting the produced assistant interference light; and vibration control means for controlling the vibrating means based on a result obtained by detection of the assistant detection means.

According to a ninth to sixteenth aspect of the present invention, there is provided an optical image measuring apparatus according to any one of the first to eighth aspects of the invention, in which the predetermined amplitude related to the vibration of the reference object which is caused by the vibrating means is set to $1/10$ of a wavelength of the interference light to the wavelength thereof.

According to a seventeenth aspect of the present invention, there is provided an optical image measuring apparatus according to the first aspect of the invention, in which the light beam outputting means includes: a light source for emitting the light beam; and light source driving means for driving the light source to periodically output the light beam at a predetermined phase difference with a frequency synchronized with the frequency of the interference light.

According to an eighteenth aspect of the present invention, there is provided an optical image measuring apparatus according to the seventeenth aspect of the invention, further including: a laser light source for outputting laser light; an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and assistant detection means for detecting the produced assistant interference light, in which the light source driving means of the light beam outputting means generates a pulse signal having a frequency synchronized with a frequency of the assistant interference light based on a result obtained by detection of the assistant detection means, and the light source is driven based on the generated pulse signal and outputs a pulsed light beam having a frequency equal to a frequency of the pulse signal.

According to a nineteenth aspect of the present invention, there is provided an optical image measuring apparatus according to the first aspect of the invention, in which the light beam outputting means includes: a light source for outputting a continuous light beam; and light beam cutoff means for periodically cutting off the outputted continuous light beam at a frequency synchronized with the frequency of the interference light.

According to a twentieth aspect of the present invention, there is provided an optical image measuring apparatus according to the nineteenth aspect of the invention, further including: a laser light source for outputting laser light; an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and assistant detection means for detecting the produced assistant interference light, in which the light beam cutoff means periodically cuts off the continuous light beam based on a result obtained by detection of the assistant detection means.

According to a twenty-first aspect of the present invention, there is provided an optical image measuring apparatus according to the first aspect of the invention, in which the first converting means is a polarizing plate for transmitting an oscillation component of the light beam in a predetermined direction.

According to a twenty-second of the present invention, there is provided an optical image measuring apparatus according to the first aspect of the invention, in which the second converting means is a wavelength plate for applying a phase difference between a P-polarized light component and an S-polarized light component of the one of the signal light and the reference light, which is the linearly polarized light, to convert the polarization characteristic thereof, the P-polarized light component and the S-polarized light component being orthogonal to each other.

According to a twenty-third aspect of the present invention, there is provided an optical image measuring apparatus according to the twenty-first aspect of the invention, in which the extracting means includes a polarization beam splitter for transmitting the P-polarized light component of the interference light and reflecting the S-polarized light component thereof.

According to a twenty-fourth aspect of the present invention, there is provided an optical image measuring apparatus according to the second aspect of the invention, further including: pulse signal generating means for outputting a pulse signal having a frequency synchronized with the frequency of the interference light; and phase shifting means for relatively shifting a phase of the outputted pulse signal to output pulse signals whose phases are shifted relative to each other to the two intensity modulating means, in which the two intensity modulating means modulate the intensities of interference light beams based on the pulse signals whose phases are shifted relative to each other by the phase shifting means.

According to a twenty-fifth aspect of the present invention, there is provided an optical image measuring apparatus according to the twenty-fourth aspect of the invention, further including: a laser light source for outputting laser light; an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and assistant detection means for detecting the produced assistant interference light, in which the pulse signal generating means outputs the pulse signal having a frequency synchronized with a frequency of the assistant interference light based on a result obtained by detection of the assistant detection means.

According to a twenty-sixth aspect of the present invention, there is provided an optical image measuring apparatus according to the second aspect of the invention, in which the two intensity modulating means include shutter means for periodically cutting off the interference light beams at the predetermined frequency.

According to the first aspect of the present invention, the frequency for the intensity modulation of the light beam which is performed by the light beam outputting means is synchronized with the frequency of the interference light. The frequency of vibration of the reference object which is caused by the vibrating means is synchronized with the frequency of the interference light and the amplitude of the vibration is set to be equal to or smaller than the wavelength of the interference light. The two polarized light components extracted by the extracting means are detected by the set of detecting means. The signal intensity of the interference light or the phase thereof is calculated based on the result obtained by detection to form the image of the object to be measured. Therefore, the interference light, in particular, an alternating current component thereof can be detected by only the set of detecting means, that is, the two detecting means to form the image of the object to be measured. In addition, the frequency for the intensity modulation of the light beam and the frequency and amplitude of vibration of the reference object can be automatically set, so it is possible to easily sample the interference light with high precision.

According to the second aspect of the present invention, the frequency for the intensity modulation of each of the interference light beams which is performed by the intensity modulating means is synchronized with the frequency of the interference light. The frequency of vibration of the reference object which is caused by the vibrating means is synchronized with the frequency of the interference light and the amplitude of the vibration is set to be equal to or smaller than the wavelength of the interference light. The two polarized light components extracted by the extracting means are detected by the set of detecting means. The signal intensity of the interference light or the phase thereof is calculated based on the result obtained by detection to form the image of the object to be measured. Therefore, the interference light, in particular, an alternating current component thereof can be detected by only the set of detecting means, that is, the two detecting means to form the image of the object to be measured. In addition, the frequency for the intensity modulation of each of the interference light beams which is performed by the intensity modulating means and the frequency and amplitude of vibration of the reference object can be automatically set, so it is possible to easily sample the interference light with high precision.

BRIEF DESCRIPTION OF THE DRAWINGS

In the accompanying drawings:

FIGS. 3A to 3E are explanatory graphs showing interference light detection modes of the optical image measuring apparatus according to the first embodiment of the present invention, in which FIG. 3A shows a temporal waveform of a light beam whose intensity is modulated and which is outputted from a broad-band light source, FIG. 3B shows a temporal waveform of an S-polarized light element of interference light in the case where the light beam outputted from the broad-band light source is continuous light, FIG. 3C shows a temporal waveform of a P-polarized light element of the interference light in the case where the light beam outputted from the broad-band light source is the continuous light, FIG. 3D shows a temporal waveform of the S-polarized light element of the interference light in the case where the intensity of the light beam outputted from the broad-band light source is modulated, and FIG. 3E shows a temporal waveform of the P-polarized light element of the interference light in the case where the intensity of the light beam outputted from the broad-band light source is modulated;

FIGS. 7A to 7C are explanatory diagrams showing sampling operations of interference light beams which are performed by a set of intensity modulating means (shutters) of the optical image measuring apparatus according to the second embodiment of the present invention, in which FIG. 7A shows a temporal waveform of interference light, FIG. 7B shows a temporal waveform of an interference light beam received through one of the set of intensity modulating means, and FIG. 7C shows a temporal waveform of an interference light beam received through the other of the set of intensity modulating means;

DETAILED DESCRIPTION OF THE PREFERRED EMBODIMENTS

An example of an optical image measuring apparatus according to each of preferred embodiments of the present invention will be described in detail with reference to the accompanying drawings. Hereinafter, a first embodiment in which image measurement is performed using a polarization characteristic of light and a second embodiment in which image measurement is performed by sampling using shutters will be described.

First Embodiment

[Structure of Apparatus]

Figure 1:
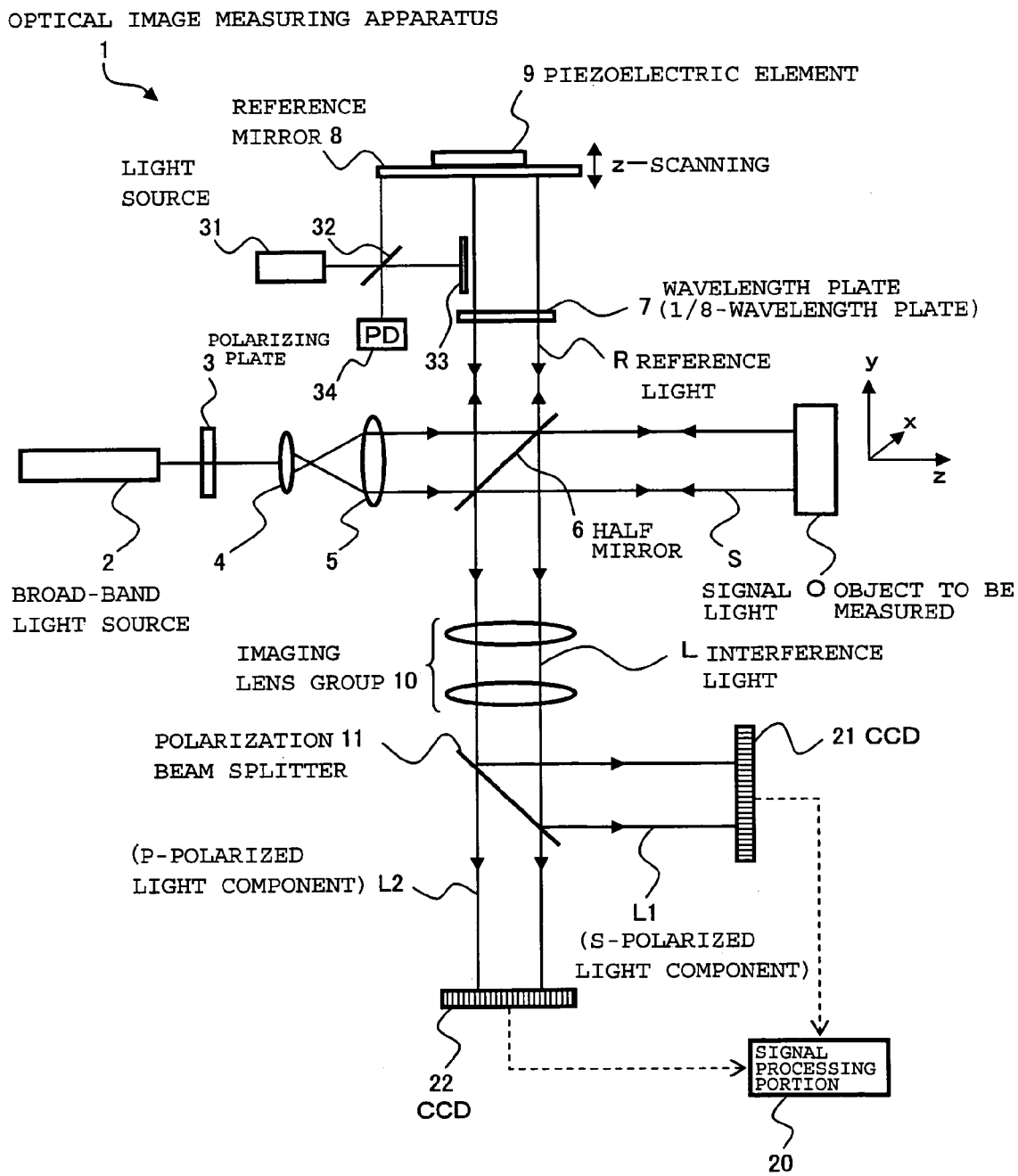
FIG. 1 is a schematic diagram showing an example of an optical system of an optical image measuring apparatus according to a first embodiment of the present invention.
Figure 2:
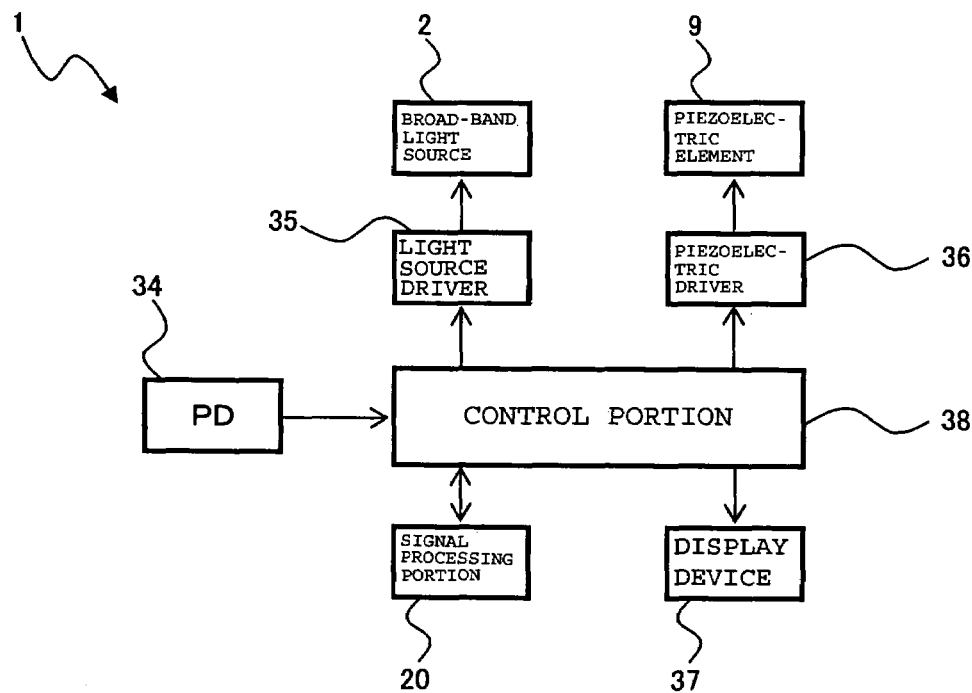
FIG. 2 is a schematic diagram showing an example of a control system of the optical image measuring apparatus according to the first embodiment of the present invention.

First, an optical image measuring apparatus according to the first embodiment of the present invention will be described in detail with reference to FIGS. 1 and 2. FIG. 1 shows a schematic structure of (mainly) an optical system of the optical image measuring apparatus according to this embodiment. FIG. 2 shows a structure of a control system of the optical image measuring apparatus according to this embodiment.

[Structure of Optical System]

The optical image measuring apparatus in this embodiment is an apparatus available to measure a sectional image and a surface image of an object to be measured, for example, in the medical field and the industrial field. Here, the object to be measured is an object which is made of a scattering medium such as a human eye, for example, in the medical field.

The optical image measuring apparatus 1 in this embodiment shown in FIG. 1 includes a broad-band light source 2 for outputting a low-coherent light beam, a polarizing plate 3 for converting a polarization characteristic of the light beam to linear polarization, lenses 4 and 5 for converting the light beam to a parallel light flux and increasing a beam diameter thereof, and a half mirror 6 for dividing the light beam into signal light S and reference light R and superimposing the signal light S and the reference light R on each other to produce interference light L. The optical image measuring apparatus 1 further includes a wavelength plate 7 for converting a polarization characteristic of the reference light R from linear polarization to circular polarization, a reference mirror 8 for totally reflecting the reference light R on a reflective surface orthogonal to a propagating direction of the reference light R, and a piezoelectric element 9 provided on a rear surface opposite to the reflective surface of the reference mirror 8. Note that the interference light L produced by the half mirror 6 corresponds to "first interference light" in the present invention.

The broad-band light source 2 corresponds to a "light source" in the present invention and is composed of an SLD, a light-emitting diode (LED), or the like. A coherent length of an available near-infrared region SLD is about 30 μm and a coherent length of an LED is about 10 μm.

In an xyz-coordinate system shown in FIG. 1, a propagating direction of the light beam outputted from the broad-band light source 2 is defined as a z-axis direction and an oscillation plane of the light beam orthogonal to the propagating direction thereof is defined as an xy-plane. The x-axis direction and a y-axis direction are defined so as to align with an oscillation plane of an electric field component of the light beam and an oscillation plane of a magnetic field component thereof, respectively.

The polarizing plate 3 corresponds to "first converting means" in the present invention and is a polarization conversion element for transmitting an oscillation component of the light beam in a predetermined direction, which is outputted from the broad-band light source 2. In this embodiment, the polarizing plate 3 is constructed to transmit an oscillation component in an angle direction by 45° with respect to an x-axis (and a y-axis) of the xy-plane. The light beam passing through the polarizing plate 3 has linearly polarized light by 45°. Therefore, the amplitudes of polarization components of the light beam in the x-axis direction and the y-axis direction are equal to each other. In other words, the amplitude of a P-polarized light component of the light beam is equal to that of an S-polarized light component thereof.

The half mirror 6 composes "dividing means" in present invention, for dividing the light beam of linear polarization which is converted to the parallel light flux into the signal light S propagating to the object to be measured O and the reference light R propagating to the reference mirror 8. The half mirror 6 transmits a part (half) of the light beam as the signal light S and reflects the rest thereof as the reference light R.

The half mirror 6 composes "superimposing means" in the present invention, for reflecting a part of the signal light S propagating through the object to be measured O, transmitting a part of the reference light R propagating through the reference mirror 8 to superimpose the signal light S and the reference light R, thereby producing the interference light L.

In this embodiment, because a Michelson interferometer, which is composed of the object to be measured ○ and the reference mirror 8 which serve as reflectors and the half mirror 6, is used, the dividing means and the superimposing means each are composed of (different reflective surface of) the same half mirror 6. On the other hand, when another interferometer such as a Mach-Zehnder interferometer is employed, an optical element composing the dividing means maybe different from that composing the superimposing means. An arbitrary non-polarization beam splitter having no influence on the polarization characteristics of the light beams (signal light S and reference light R) is applied to each of the dividing means and the superimposing means.

The wavelength plate 7 composes "second converting means" in the present invention and is a polarization conversion element for converting the polarization characteristic of the reference light R from linear polarization to circular polarization. In this embodiment, a ⅛-wavelength plate is used as the wavelength plate 7. Therefore, when the reference light R passes through the wavelength plate 7, a phase difference between a P-polarized light component and an S-polarized light component becomes $\pi/4$. In each of the case where the reference light R propagates from the half mirror 6 to the reference mirror 8 and the case where the reference light R is reflected on the reference mirror 8 and incident on the half mirror 6 again, the above-mentioned phase difference is applied to the reference light R. As a result, a phase difference of $\pi/2$ is applied to the reference light R. Thus, the wavelength plate 7 acts on the reference light R having linearly polarized light by 45° in the same manner as the ¼-wavelength plate, so the reference light R which is incident on the half mirror 6 again is converted to circularly polarized light. When another interferometer such as the Mach-Zehnder interferometer is used as described above, it is possible to apply the ¼-wavelength plate.

The reference mirror 8 composes a "reference object" in the present invention and is moved in an optical path direction of the reference light R to extract reflection light of the signal light S at each depth (z-coordinate) of the object to be measured ○. More specifically, because the light beam from the broad-band light source 2 is the low-coherent light, only the signal light S propagating a distance substantially equal to a propagating distance of the reference light R is useful to produce the interference light L. In other words, only reflection light on the object to be measured ○ at a z-position which is located at a distance substantially equal to a distance to the reference mirror 8 with respect to the half mirror 6 interferes with the reference light R to produce the interference light L. Therefore, the position of the reference mirror 8 is changed (z-scanning is performed) to continuously extract reflection light on a region of the object to be measured ○ at each z-coordinate.

The reference mirror 8 is subjected to z-scanning in the optical path direction of the reference light R by the piezoelectric element 9 so as to act to shift the frequency of the reference light R. Frequency shift applied by the movement of the reference mirror 8 is called Doppler frequency shift in some cases. Further, the piezoelectric element 9 can oscillate the reference mirror 8. The oscillation and the z-scanning can be performed simultaneously. The piezoelectric element 9 composes "oscillating means" in the present invention.

The optical image measuring apparatus 1 according to this embodiment further includes an imaging lens group 10 for imaging the interference light L produced by the half mirror 6 serving as the superimposing means, a polarization beam splitter 11 for dividing an optical path of the interference light L into two according to a polarization characteristic thereof, CCDs (cameras) 21 and 22 provided on respective optical paths into which the optical path of the interference light L is divided, and a signal processing portion 20 for processing respective results obtained by detection with the CCD 21 and 22.

The polarization beam splitter 11 composes "extracting means" in the present invention, for extracting a plurality of difference polarization components of the interference light L. More specifically, the polarization beam splitter 11 acts to reflect an S-polarized light component L1 of the interference light L to allow the reflected S-polarized light component L1 to enter the CCD 21 and to transmit a P-polarized light component L2 thereof to allow the transmitted P-polarized light component L2 to enter the CCD 22. The amplitude (that is, maximum intensity) of S-polarized light component L1 of the interference light L is equal to that of the P-polarized light component L2 thereof.

The CCDs 21 and 22 compose "a pair of detecting means" in the present invention and each are a storage type two-dimensional photo sensor array for interference light detection. The CCD 21 detects the S-polarized light component L1 of the interference light L extracted by the polarization beam splitter 11, performs photoelectric conversion to generate a detection signal, and outputs the detection signal to the signal processing portion 20. Similarly, the CCD 22 detects the extracted P-polarized light component L2 of the extracted interference light L, performs photoelectric conversion to generate a detection signal, and outputs the detection signal to the signal processing portion 20. Each of the detection signals outputted from the CCDs 21 and 22 is the above-mentioned heterodyne signal.

The signal processing portion 20 is "signal processing means" in the present invention, for executing calculation processing described later based on the detection signals outputted from the CCDs 21 and 22 to form various images such as a two-dimensional sectional image of the object to be measured ○. The signal processing portion 20 includes a storage device storing a predetermined calculation program, such as a ROM, and a calculation control device executing the calculation program, such as a CPU.

The optical image measuring apparatus 1 according to this embodiment further includes a light source 31, a beam splitter 32, a reflecting mirror 33, a photodetector (PD) 34, in order to modulate the amplitude of the light beam from the broad-band light source 2 while frequency shift applied to the reference light R is monitored.

The light source 31 corresponds to a "laser light source" in the present invention and is composed of, for example, a laser diode for emitting laser light having a coherent length longer than that of the light beam from the broad-band light source 2. The beam splitter 32 divides the laser light from the light source 31 into first laser light (reflection light) propagating through the reference mirror 8 and second laser light (transmission light) propagating through the reflecting mirror 33 disposed to be fixed. Then, the beam splitter 32 superimposes the first laser light which has been subjected to frequency shift by the piezoelectric element 9 and the second laser light reflected on the reflecting mirror 33 on each other to produce interference light. The beam splitter 32, the reflecting mirror 33, and the reference mirror 8 compose an "interference optical system" in the present invention. The interference light produced by the interference optical system corresponds to "auxiliary interference light". The auxiliary interference light has a frequency and a wavelength which are equal to those of the interference light L produced at half mirror 6.

The photo detector 34 composes "assistant detecting means" in the present invention. The photodetector 34 detects the auxiliary interference light produced by the interference optical system and outputs an electrical signal having a frequency and a wavelength equal to those of the auxiliary interference light.

[Structure of Control System]

Next, the control system of the optical image measuring apparatus 1 according to this embodiment will be described with reference to FIG. 2. The control system of the optical image measuring apparatus 1 includes a light source driver 35 for driving the broad-band light source 2, a piezoelectric driver 36 for driving the piezoelectric element 9, a display device 37 for displaying the formed image, and a control portion 38 for controlling respective portions of the apparatus. A detection signal from the photodetector 34 and an image (image signal) formed by the signal processing portion 20 are inputted to the control portion 38.

The light source driver 35 operates to generate a pulse signal having a frequency (for example, a frequency equal to that of the electrical signal) synchronized with the electrical signal outputted from the photo detector 34 and to output the pulse signal to the broad-band light source 2 under the control of the control portion 38. The broad-band light source 2 is driven based on the pulse signal outputted from the light source driver 35 and outputs a pulsed light beam having a frequency equal to that of the pulse signal. The light beam from the broad-band light source 2 is outputted as, for example, pulsed light of a rectangular train with a duty of 50%. The light source driver 35 composes "light source driving means" in the present invention.

The broad-band light source 2, the light source 31, the beam splitter 32, the reflecting mirror 33, the photo detector (PD) 34, and the light source driver 35 compose "light beam outputting means" in the present invention for modulating the intensity of a light beam at a predetermined frequency and outputting the modulated light beam.

The piezoelectric driver 36 operates to generate a pulse signal which has a frequency (for example, a frequency equal to that of the electrical signal) synchronized with the electrical signal outputted from the photo detector 34 and an amplitude in which an amplitude of vibration of the piezoelectric element 9 becomes, for example, ½ of the wavelength of the electrical signal and to output the pulse signal to the piezoelectric element 9 under the control of the control portion 38. Assume that a relationship between the amplitude of the electrical signal sent to the piezoelectric element 9 and the amplitude of vibration of the piezoelectric element 9 is known. The piezoelectric driver 36 outputs the electrical signal having the amplitude obtained from the relationship to the piezoelectric element 9. The piezoelectric driver 36 composes "vibration control means" in the present invention.

The display device 37 is composed of a monitor device such as a liquid crystal display or a CRT display and displays an image based on an image signal outputted from the control portion 38.

[Measurement Mode]

Subsequently, a measurement mode with respect to the signal intensity of the interference light L and the spatial phase distribution thereof, that is, a measurement mode with respect to the signal intensity of the heterodyne signal and phase information thereof, which is executed by the optical image measuring apparatus 1 according to this embodiment will be described. The following detailed signal processing is executed by the signal processing portion 20 shown in FIG. 1.

The optical image measuring apparatus 1 according to this embodiment forms the signal light S and the reference light R whose polarization characteristics are different from each other and detects the interference light L of those as the heterodyne signal to obtain a surface image or a sectional image of the object to be measured ○.

First, the basic principle of the measurement mode executed by the optical image measuring apparatus 1 using the polarization characteristic of the light will be described.

The light beam outputted from the broad-band light source 2 is converted to the linearly polarized light in the direction forming an angle of 45° with respect to the x-axis by the polarizing plate 3. The beam diameter of the converted linearly polarized light is increased by the lenses 4 and 5 and the linearly polarized light whose beam diameter is increased is converted to the parallel light flux thereby. Then, the light is incident on the half mirror 6 and divided into two, that is, the signal light S and the reference light R.

The signal light S is incident on the object to be measured ○ made of a scattering medium and reflected on a surface thereof and sectional surfaces at various depths. A part of a reflection light wave from the object to be measured ○ is reflected on the half mirror 6 and transmitted to the imaging lens group 10.

On the other hand, the reference light R passes through the wavelength plate 7 and propagates to the reference mirror 8. At this time, the reference mirror 8 is being driven (z-scanning is being performed) in the optical direction of the reference light R by the piezoelectric element 9. The reference light R is subjected to frequency shift having a predetermined amount by the reference mirror 8 moved by the piezoelectric element 9, and then passes through the wavelength plate 7 again. Here, because the polarization characteristic of the reference light R is the linearly polarized light by 45° and the wavelength plate 7 is the ⅛-wavelength plate, the polarization characteristic of the reference light R passing through the wavelength plate 7 two times is converted to the circular polarization. A part of the reference light R whose polarization characteristic is converted to the circular polarization passes through the half mirror 6 and transmitted to the imaging lens group 10.

At this time, the half mirror 6 superimposes the signal light S of the linear polarization which is reflected on the object to be measured ○ and the reference light R which is converted to the circularly polarized light by frequency shift on each other to produce the interference light L, thereby transmitting the interference light L to the imaging lens group 10. The interference light L is propagated to the polarization beam splitter 11 through the imaging lens group 10.

The polarization beam splitter 11 acts to reflect the S-polarized light component L1 of the interference light L and to transmit the P-polarized light component L2 thereof. The S-polarized light component L1 of the interference light L is detected by the CCD 21 and the P-polarized light component L2 thereof is detected by the CCD 22. The S-polarized light component L1 of the interference light L includes an S-polarized light component Ess of the signal light S and an S-polarized light component Ers of the reference light R. The P-polarized light component L2 of the interference light L includes a P-polarized light component Esp of the signal light S and a P-polarized light component Erp of the reference light R. The S-polarized light component Ess of the signal light S, the P-polarized light component Esp thereof, the S-polarized light component Ers of the reference light R, and the P-polarized light component Erp thereof each are expressed by the following expressions.

$$Ess = \sqrt{I_{ss}} \sin(2\pi f t + \phi) \quad (2)$$

$$Esp = \sqrt{I_{sp}} \sin(2\pi f t + \phi) \quad (3)$$

$$Ers = \sqrt{I_{rs}} \sin[2\pi(f+f_D)t + \phi'] \quad (4)$$

$$Erp = \sqrt{I_{rp}} \sin[2\pi(f+f_D)t + \phi' + 90°] \quad (5)$$

Here, f indicates a frequency of the light beam emitted from the broad-band light source 2, $f_D$ indicates a frequency shift, $\phi$ indicates an initial phase of the signal light S, and $\phi'$ indicates an initial phase of the reference light R. Assume that a difference between the initial phase of the signal light S and the initial phase of the reference light R is given by $\Delta\phi(=\phi-\phi')$. Referring to the expressions (2) to (5), the S-polarized light component L1 of the interference light L and the P-polarized light component L2 thereof are detected by the CCDs 21 and 22 as heterodyne signals $i_1$ and $i_2$ expressed by the following expressions.

$$i_1 \propto |E_{ss} + E_{rs}|^2 \propto I_{rs} + I_{ss} + 2\sqrt{I_{rs}I_{ss}} \cos(2\pi f_D t + \Delta\phi) \quad (6)$$

$$i_2 \propto |E_{sp} + E_{rp}|^2 \propto I_{rp} + I_{sp} + 2\sqrt{I_{rp}I_{sp}} \sin(2\pi f_D t + \Delta\phi) \quad (7)$$

As is apparent from the comparison between the expressions (6) and (7), a phase difference between the alternating signals of the third terms of the respective expressions is 90° because of the cosine and sine functions with the same phase. In the present invention, in addition to utilizing such a feature, the light beams whose intensity is periodically modulated is used as measurement light to allow the realization of optical heterodyne detection without sampling processing using shutters, thereby measuring the signal intensity of the interference light L and the spatial phase distribution thereof. In a conventional optical image measuring technique, single interference light is sampled using a plurality of functions having different phases to detect cosine and sine components thereof. In contrast to this, the feature of the present invention is that the polarization characteristics of the reference light R and the signal light S are converted to produce the plurality of (two in this embodiment) interference light components having the different phases and the produced interference light components are separately detected. Hereinafter, measurement fundamentals in the present invention will be described.

The optical image measuring apparatus 1 according to this embodiment controls the frequency for the intensity modulation of the light beam outputted from the broad-band light source 2 and the frequency and amplitude of vibration which is caused by the piezoelectric element 9 using the light source 31, the beam splitter 32, the reflecting mirror 33, the photo detector (PD) 34, and the light source driver 35.

The laser light outputted from the light source 31 is divided into an optical path in the reference mirror 8 direction (reflection laser light beam) and an optical path in the reflecting mirror 33 direction (transmission laser light beam) by the beam splitter 32. The laser light beam on the optical path in the reference mirror 8 direction propagates through the reference mirror 8 to be subjected to z-scanning by the piezoelectric element 9, frequency shift by the reference mirror 8 is subjected to, and then is incident on the beam splitter 32 again. On the other hand, the laser light beam on the optical path in the reflecting mirror 33 direction is incident, as reflection light on the reflecting mirror 33, on the beam splitter 32 again (without frequency shift). The laser light beams propagating on both the optical paths are superimposed on each other by the beam splitter 32 to produce interference light. The interference light is detected by the photo detector 34.

As in the case of the reference light R, the interference light detected by the photodetector 34 is subjected to the Doppler frequency shift using the reference mirror 8, so the interference light is subjected to frequency shift having the amount of shift equal to that of the reference light R. Therefore, the interference light has a frequency and a wavelength which are equal to that of the interference light L produced from the signal light S and the reference light R.

The photo detector 34 outputs an electrical signal corresponding to the detected interference light to the light source driver 35. As in the case of the heterodyne signal expressed by the expression (1), the electrical signal includes a direct current component and an alternating current component. The alternating current component has a frequency equal to the beat frequency of the interference light L as described above.

The light source driver 35 outputs the pulse signal having the frequency synchronized with the electrical signal from the photo detector 34 to the broad-band light source 2. The broad-band light source 2 is driven based on the pulse signal from the light source driver 35 and outputs the pulsed light beam having the frequency synchronized with the pulse signal, that is, a frequency synchronized with the frequency of the interference light L.

The piezoelectric driver 36 generates an electrical signal which has the frequency synchronized with the electrical signal outputted from the photo detector 34 and the amplitude in which the amplitude of vibration of the piezoelectric element 9 becomes ½ of the wavelength of the electrical signal therefrom and outputs the generated electrical signal to the piezoelectric element 9. Therefore, the reference mirror 8 is vibrated by the piezoelectric element 9 at the frequency synchronized with the frequency of the interference light L with the amplitude equal to ½ of the wavelength of the interference light L.

As described above, in this embodiment, the amount of shift of the frequency shift which is applied to the reference light R is monitored. The object to be measured O is measured using a pulsed light beam having the frequency synchronized with the amount of shift (=the frequency of the interference light L) and the reference mirror 8 is vibrated at the frequency synchronized with the interference light L with a longitudinal movement equal to ½ of the wavelength of the interference light L.

The light beam from the broad-band light source 2 is outputted as, for example, pulsed light of a rectangular train with a duty of 50%. The duty ratio of the light beam is not limited to 50%. The pulse shape may be other than the rectangular train (for example, a triangular train or a trapezoidal train). For example, a light beam obtained by modulation between output intensities of 50 and 100 can be also applied instead of pulsed light obtained by switching between output intensities of 0 and 100. That is, the important point is not to control the degree of the intensity modulation of the light beam but to control the frequency for the intensity modulation such that the frequency therefor becomes substantially equal to the beat frequency of the interference light L.

It is only necessary that the longitudinal movement of the reference mirror 8 be equal to or smaller than the wavelength of the interference light L. When the reference mirror 8 is vibrated with a movement that is larger than the wavelength of the interference light L, for example, the reference light R reflected on the reference mirror 8 becomes a discontinuous waveform, so an inconvenience occurs. In view of an S/N ratio of the reference light R, it is preferable that the longitudinal movement of the reference mirror 8 be equal to or larger than 1/10 of the wavelength of the interference light L and equal to or smaller than the wavelength thereof. In order to deal with such an inconvenience, it is desirable that the longitudinal movement of the reference mirror 8 be equal to or smaller than 1/2 of the wavelength of the interference light L.

FIGS. 3A to 3E show an example of such a measurement mode. Hereinafter, assume that a modulation frequency of the intensity of the light beam outputted from the broad-band light source 2 is $f_m$. As described above, $f_D$ indicates the frequency shift applied to the reference light R (beat frequency of the interference light L). The modulation frequency $f_m$ of the light beam is equal to (synchronized with) the frequency shift $f_D$.

Figure 3:
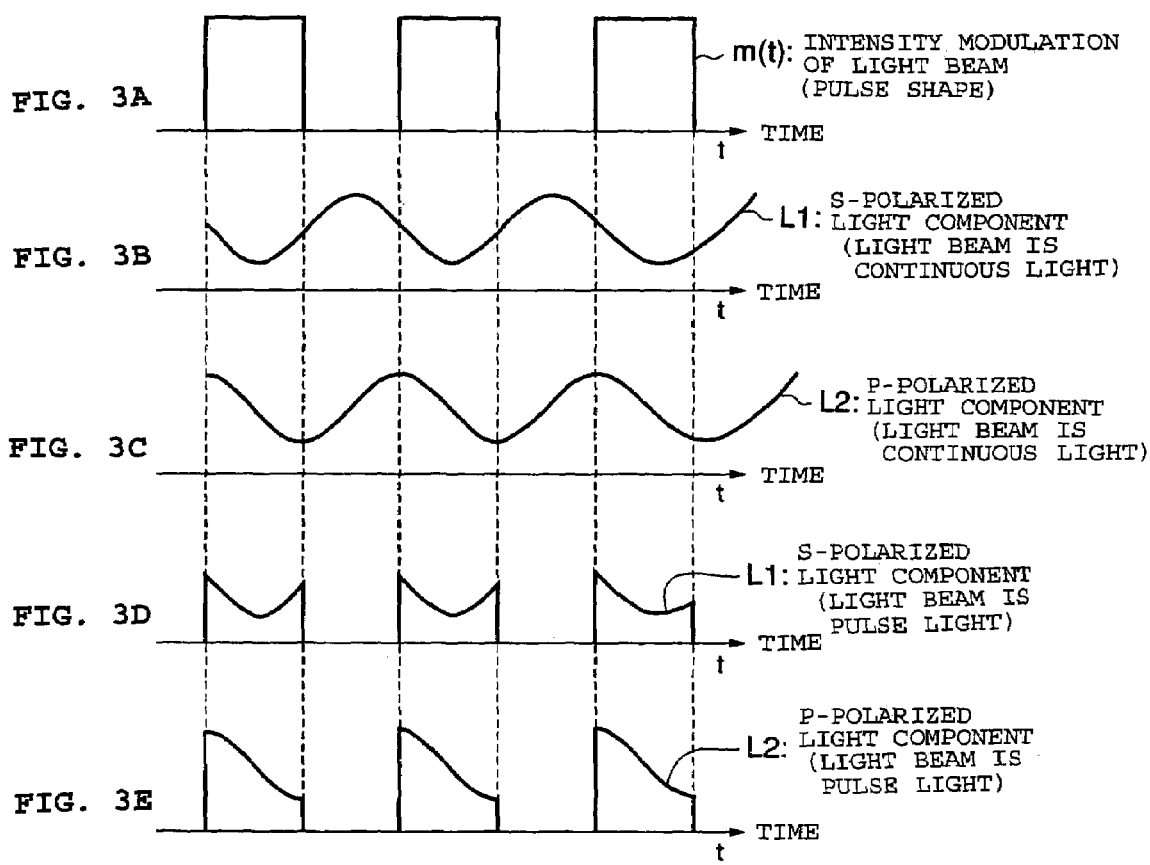

FIG. 3A shows a temporal waveform of a light beam which is subjected to intensity modulation at the modulation frequency $f_m$ and outputted from the broad-band light source 2. FIG. 3B shows a temporal waveform of the S-polarized light component L1 of the interference light L (beat frequency $f_D$) in the case where the light beam is continuous light and thus the reference light R and the signal light S each are continuous light. FIG. 3C shows a temporal waveform of the P-polarized light component L2 of the interference light L in the case where the reference light R and the signal light S each are continuous light. Note that a phase difference between the S-polarized light component L1 and the P-polarized light component L2 as shown in FIGS. 3B and 3C is 90°.

FIG. 3D shows a temporal waveform of the S-polarized light component L1 of the interference light L in the case where the light beam from the broad-band light source 2 is subjected to the intensity modulation as shown in FIG. 3A (this corresponds to FIG. 3B). FIG. 3E shows a temporal waveform of the P-polarized light component L2 of the interference light L in the case where the light beam from the broad-band light source 2 is subjected to the intensity modulation as shown in FIG. 3A (this corresponds to FIG. 3C). A phase difference between the S-polarized light component L1 and the P-polarized light component L2 as shown in FIGS. 3D and 3E is 90°.

The CCD 21 detects the S-polarized light component L1 having the temporal waveform shown in FIG. 3D. The light beam from the broad-band light source 2 is a light pulse of a rectangular train having the frequency $f_m$ and a duty of 50%. When a difference between the modulation frequency $f_m$ and the beat frequency $f_D$ of the interference light L ($\delta f = |f_m - f_D|$) is sufficiently smaller than a response frequency of the CCD 21 serving as the storage type photo sensor, a detection signal of the S-polarized light component L1 which is outputted from the CCD 21 becomes proportional to the amount of photo charge stored for a detection period. Therefore, the detection signal is expressed by the following expression (for example, see M. Akiba, K. P. Chan, and N. Tanno, Japanese Journal of Applied Physics, Vol. 39, L1194 (2000)).

$$S_1(t) = \langle K_1 m(t) i_1(t) \rangle \qquad (8)$$

$$= K_1 \left[ \frac{1}{2} I_{ss} + \frac{1}{2} I_{rs} + \frac{2}{\pi} \sqrt{I_{ss} I_{rs}} \cos(2\pi \delta f t + \beta) \right]$$

Here, <·> indicates a time average produced by a storage effect of the CCD 21. In addition, $K_1$ indicates photo detection efficiency including reflectance of the polarization beam splitter 11 and a photoelectric conversion rate of the CCD 21, m(t) indicates a function for modulating the output intensity of the broad-band light source 2 (function indicating a rectangular pulse), and $\beta$ indicates an initial phase value for measurement. As is apparent from the expression (8), the detection signal outputted from the CCD 21 includes the term related to an amplitude $\sqrt{I_{ss} I_{rs}}$ of the S-polarized light component L1 of the interference light L and a phase ($2\pi \delta f t + \beta$) thereof in addition to the term related to the intensity of the signal light S and the term related to the intensity of the reference light R (background light component).

In order to obtain a high-precision image, as shown in FIGS. 3B and 3D, it is preferable that part of the S-polarized light component L1 detected by the CCD 21 include a "valley" part of the S-polarized light component L1, that is, apart in which the intensity thereof is minimum. In addition, as shown in FIGS. 3C and 3E, it is preferable that part of the P-polarized light component L2 detected by the CCD 22 include a "peak" part of the P-polarized light component L2, that is, a part in which the intensity thereof is maximum. In contrast to this, a "peak" part of the S-polarized light component L1 and a "valley" part of the P-polarized light component L2 may be detected.

Similarly, the CCD 22 detects the P-polarized light component L2 having the temporal waveform shown in FIG. 3E and outputs a detection signal as expressed by the following expression.

$$S_2(t) = K_2 \left[ \frac{1}{2} I_{sp} + \frac{1}{2} I_{rp} + \frac{2}{\pi} \sqrt{I_{sp} I_{rp}} \sin(2\pi \delta f t + \beta) \right] \qquad (9)$$

Here, $K_2$ indicates photo detection efficiency including transmittance of the polarization beam splitter 11 and a photoelectric conversion rate of the CCD 22.

Next, calculation processing of the signal intensity of the interference light L based on the detection signals (expressed by the expressions (8) and (9)) outputted from the CCDs 21 and 22 will be described.

Because the reference light R is converted to the circularly polarized light by the wavelength plate 7, it can be considered that an intensity $I_{rs}$ of the S-polarized light component Ers of the reference light R is equal to an intensity $I_{rp}$ of the P-polarized light component Erp thereof (this indicates $I_{rs} = I_{rp} = I_r$).

On the other hand, it is assumed that the reflection light of the signal light S on the object to be measured O does not significantly depend on the polarization characteristic of the incident light thereof, so it can be considered that an intensity $I_{ss}$ of the S-polarized light component Ess of the signal light S is equal to or close to the intensity $I_{sp}$ of the P-polarized light component Esp thereof (this indicates $I_{ss} = I_{sp} = I_s$). Because the signal light S is scattered or absorbed in the object to be measured O, it can be assumed that the intensity thereof is generally sufficiently smaller than that of the reference light R ($I_s << I_r$).

The first term and the second term of the right side of each of the expressions (8) and (9) indicate the intensity of the background light. The intensity of the background light can be measured in advance or separately. For example, a light beam which is continuous light is outputted from the broad-band light source 2 and detected by the CCD 21 and the like.

The detected light beam is integrated for a period corresponding to one wavelength (or integral multiple thereof) and the third term (alternating current component; phase quadrature component) is cancelled. Therefore, it is possible to obtain the intensity of the background light (background light component).

The obtained background light component is divided by the intensities of the detection signals from the CCDs 21 and 22 to calculate phase quadrature components of the detection signals, that is, a phase quadrature component $S_1'(t)$ of the S-polarized light component L1 of the interference light L and a phase quadrature component $S_2'(t)$ of the P-polarized light component L2 thereof (see the following expressions).

$$S_1'(t) = K_1 \frac{2}{\pi} \sqrt{I_s I_r} \cos(2\pi \delta f t + \beta) \quad (10)$$

$$S_2'(t) = K_2 \frac{2}{\pi} \sqrt{I_s I_r} \sin(2\pi \delta f t + \beta) \quad (11)$$

When the expressions (10) and (11) are used, the amplitude of the interference light L is expressed by the following expression.

$$\sqrt{I_s I_r} \propto \sqrt{S_1'^2 + S_2'^2} \quad (12)$$

The optical image measuring apparatus 1 according to this embodiment produces an image of a spatial phase distribution of the interference light L as follows.

Assume that, at a measurement time $t=t_1$, a phase quadrature component $S_1'(t_1)$ of the S-polarized light component L1 of the interference light L is detected by the CCD 21 and a phase quadrature component $S_2'(t_1)$ of the P-polarized light component L2 thereof is detected by the CCD 22. When a ratio between both the phase quadrature components is calculated, the following signal is obtained.

$$S_3 = \frac{S_2'(t_1)}{S_1'(t_1)} = \tan(2\pi \delta f t_1 + \beta) \quad (13)$$

As is apparent from the expression (13), a signal $S_3$ expressed thereby does not depend on the amplitude of the interference light L and is composed of only phase information. In this embodiment, the S-polarized light component L1 and the P-polarized light component L2 are detected by the CCDs 21 and 22, each of which has a light receiving surface on which a plurality of pixels are two-dimensionally arranged. Therefore, a phase $\beta(x, y, t_1)$ of a signal detected from each of the pixels is expressed by the following expression (where (x, y) indicates coordinates of each of the pixels on the light receiving surface).

$$\beta(x, y, t_1) = \tan^{-1}\left[\frac{S_2'(x, y, t_1)}{S_1'(x, y, t_1)}\right] - 2\pi \delta f t_1 \quad (14)$$

The second term of the expression (14) is an instantaneous phase value of an alternating current signal having a frequency δf of zero or substantially zero (≈0) at the measurement time $t_1$, so it can be considered that the phase value is maintained constant regardless of the positions of the pixels of the CCDs 21 and 22, that is, the coordinates (x, y) thereof. Therefore, for example, a difference between a reference phase $\phi(x_1, y_1, t_1)$ of a detection signal detected from a pixel located at a specific point ($x=x_1$, $y=y_1$) on the light receiving surface of each of the CCDs 21 and 22 and a phase of a detection signal detected from each of the pixels is obtained. Thus, it is possible to image a spatial phase difference distribution of the heterodyne signals, that is, a spatial phase difference distribution of the interference light L.

The frequency information of the interference light L can be also obtained from the phase information thereof. Assume that the phases of the interference light L (S-polarized light component L1 and P-polarized light component L2) at two measurement times $t=t_1$ and $t=t_2$ are denoted by $\beta(x, y, t_1)$ and $\beta(x, y, t_2)$. Then, the difference δf between the beat frequency $f_D$ of the interference light L and the modulation frequency $f_m$ of the light beam from the broad-band light source 2 is expressed by the following expression.

$$\delta f = \frac{1}{2\pi} \left| \frac{\beta(x, y, t_1) - \beta(x, y, t_2)}{t_1 - t_2} \right| \quad (15)$$

Because the modulation frequency $f_m$ of the light beam is known, the heterodyne frequency, that is, the beat frequency $f_D$ of the interference light L can be calculated based on the expression (10) or (11). It can be considered that the heterodyne frequency measuring method is effective for, for example, Doppler velocity measurement using a heterodyne interference method.

[Operation and Effect]

According to the optical image measuring apparatus 1 in this embodiment, the alternating current component of the interference light L can be obtained by a smaller number of (two) CCDs than the number of CCDs in a conventional case. Because the frequency of the light beam and the frequency and amplitude of vibration of the reference mirror 8 are automatically set, the interference light L can be easily sampled with high precision.

MODIFIED EXAMPLE

In the above-mentioned structure, the z-scanning of the reference mirror 8 using the piezoelectric element 9 is performed to apply the frequency shift to the reference light R. A frequency shifter (such as an optoelectronic modulator or an acoustooptic modulator) may be provided on the optical path of the reference light R. A structural example in such a case will be described later (see FIG. 4). The frequency shifter may be on the optical path of the signal light S. This is because it is only necessary that the frequency of the signal light S and the frequency of the reference light R at the time of superimposition be shifted relative to each other in the image measurement according to the present invention.

In the above-mentioned structure, the light beam from the broad-band light source 2 is converted to the linearly polarized light and then divided into the signal light S and the reference light R. Each of the signal light S and the reference light R may be converted to the linearly polarized light after the division of the light beam. In such a case, it is necessary to provide a polarizing plate on each of the optical path of the signal light S and the optical path of the reference light R, so the optical image measuring apparatus becomes slightly more complex than the above-mentioned structure. Therefore, the above-mentioned structure may be more suitable in practical use.

In the above-mentioned structure, the polarization characteristic of the reference light R is converted to the circular polarization. It is also possible that the signal light S is converted to the circularly polarized light and superimposed on the reference light R which is the linearly polarized light. However, as described above, the reflection light of the signal light S on the object to be measured O is slightly weaker than the reference light R. Therefore, when the wavelength plate is disposed on the optical path of the signal light S, the signal light S passing therethrough weakens. The weakening of the intensity of the signal light S including information related to the object to be measured O may affect measurement sensitivity. Thus, the above-mentioned structure in which the polarization characteristic of the reference light R is converted to the circular polarization has an advantage. Note that the same is expected in the case where the frequency shifter is disposed.

In the above-mentioned structure, the light source 31, the beam splitter 32, the reflecting mirror 33, and the photo detector 34 are provided to monitor the amount of frequency shift of the reference light R and a monitoring result is fed back for the intensity modulation of the light beam. For example, when the amount of frequency shift applied to the reference light R is set, the light source driver 35 for automatically generating a pulse signal having a frequency synchronized with the set amount of frequency shift may be provided to control the intensity modulation of the light beam. Similarly, when the frequency and wavelength of the produced interference light L are known already, it is possible to provide the piezoelectric driver 36 for generating an electrical signal having an amplitude necessary to vibrate the reference mirror 8 at a frequency synchronized with the frequency of the interference light L with the longitudinal movement equal to ½ of the wavelength of the interference light L (longitudinal movement equal to or smaller than the wavelength, preferably, longitudinal movement equal to 1/10 of the wavelength to the wavelength, more preferably, longitudinal movement equal to or smaller than ½ of the wavelength).

The broad-band light source 2 for emitting a continuous light beam (continuous light) and a shutter for periodically cutting off the continuous light beam at a frequency synchronized with the interference light L instead of the light source driver 35 for pulse-driving the broad-band light source 2 may be provided to periodically modulate the intensity of the light beam. In such a case, the shutter composes "light beam cutoff means" in the present invention and the broad-band light source 2 and the shutter compose "light beam outputting means" in the present invention.

The measurement mode for obtaining the sectional image of the object to be measured O at each depth during the z-scanning of the reference mirror 8 has been described. When the measurement is performed with a state in which the position of the reference mirror 8 is fixed, it is possible to obtain a still image and a dynamic picture image of the object to be measured O at a depth with high precision.

When a wavelength plate (½-wavelength plate) is provided on the optical path of the signal light S, that is, the optical path between the half mirror 6 and the object to be measured O, it is possible to correct a tilt of the signal light S in the polarization direction thereof, which is caused by a change in phase when the signal light S passes through the object to be measured O.

The detecting means of the optical image measuring apparatus 1 are not limited to the above-mentioned CCDs. The detecting means may be a sensor having both a function of detecting the interference light and performing photoelectric conversion thereon and a function of storing detected charges, such as a line sensor including an integrated circuit. A one-dimensional sensor or a two-dimensional sensor may be used.

The optical image measuring apparatus 1 having the Michelson type interferometer has been described. It is also possible to use another interferometer such as a Mach-Zehnder type interferometer (for example, see JP 3245135 B made by the present inventors et al. of the present invention).

An optical fiber (bundle) used as a light guide member is provided in a part of the interferometer. Therefore, the degree of freedom of an apparatus design can be improved, the apparatus can be made compact, or the degree of freedom of location of the object to be measured can be improved (for example, see JP 3245135 B).

When the optical image measuring apparatus 1 according to this embodiment is applied in, for example, an ophthalmologic field, two-dimensional sectional images of retina and cornea can be obtained in addition to the blood flow measurement on the eye fundus. Therefore, it is possible to measure, for example, the number of endothelial cells of the cornea. Various other applications are also possible.

Figure 4:
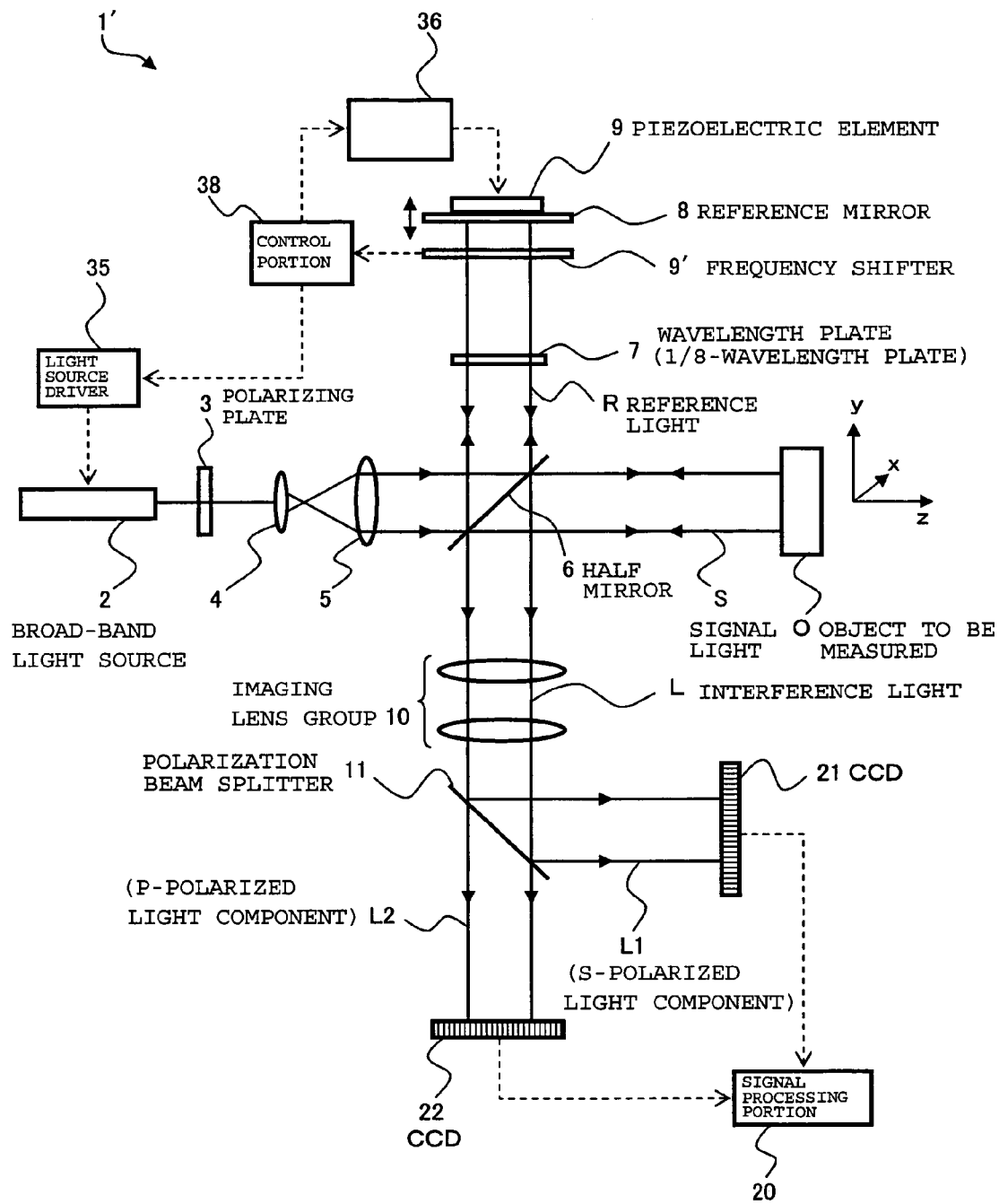
FIG. 4 is a schematic diagram showing a modified example of the optical system of the optical image measuring apparatus according to the first embodiment of the present invention.

FIG. 4 shows a modified example of the optical image measuring apparatus according to this embodiment. An optical image measuring apparatus 1' shown in FIG. 4 has substantially the same structure as that described in the optical image measuring apparatus 1 according to this embodiment. The optical image measuring apparatus 1' includes a frequency shifter 9' for shifting the frequency of the reference light R as described above. In this modified example, the frequency of the interference light L is equal to the amount of frequency shift applied by the frequency shifter 9'.

The optical image measuring apparatus 1' includes the light source driver 35, the piezoelectric driver 36, and the control portion 38 as in the optical image measuring apparatus 1 according to this embodiment. Although not shown, the display device 37 is also provided.

The frequency shifter 9' transmits an electrical signal indicating the amount of shift of the frequency of the reference light R, such as an electrical signal having a frequency equal to the amount of shift thereof to the control portion 38. The control portion 38 controls the light source driver 35 and the piezoelectric driver 36 based on the electrical signal.

As in the case of the structure according to this embodiment, the light source driver 35 generates the pulse signal having the frequency synchronized with the frequency of the electrical signal (for example, frequency equal to that of the electrical signal) and outputs the generated pulse signal to the broad-band light source 2. The broad-band light source 2 is driven based on the pulse signal and outputs a pulsed light beam having a frequency equal to that of the pulse signal. Therefore, the light beam is subjected to intensity modulation at a frequency synchronized with the frequency of the interference light L.

As in the case of the structure according to this embodiment, the piezoelectric driver 36 generates an electrical signal which has the frequency synchronized with the frequency of the electrical signal (for example, frequency equal to that of the electrical signal) from the frequency shifter 9' and the amplitude in which the amplitude of vibration of the piezoelectric element 9 becomes ½ of the wavelength of the electrical signal, and the driver outputs the generated electrical signal to the piezoelectric element 9. Therefore, the vibration of the piezoelectric element 9 corresponds to the frequency synchronized with the frequency of the interference light L and the amplitude of longitudinal movement thereof becomes (a predetermined amplitude equal to or smaller than) ½ of the wavelength of the interference light L.

According to such a structure in this modified example, even when the frequency shifter is used to produce the interference light L, the alternating current component of the interference light L can be obtained by a smaller number of (two) CCDs than the number of CCDs in a conventional case. In addition, when the frequency of the light beam and the frequency and amplitude of vibration of the reference mirror 8 are automatically set, the interference light L can be easily sampled with high precision.

When the frequency shift is to be performed using both the piezoelectric element 9 and the frequency shifter 9', the structure according to this embodiment and the structure of this modified example are combined with each other. Therefore, each of the frequency for the intensity modulation of the interference light and the frequency of vibration of the piezoelectric element 9 can be synchronized with the frequency of the interference light L. In addition, the amplitude of vibration of the piezoelectric element 9 can be set to a predetermined amplitude equal to or smaller than the wavelength of the interference light L.

Second Embodiment

Subsequently, an optical image measuring apparatus according to a second embodiment of the present invention will be described. In this embodiment, as described above, the interference light L is sampled using shutters.

[Structure of Apparatus]

Figure 5:
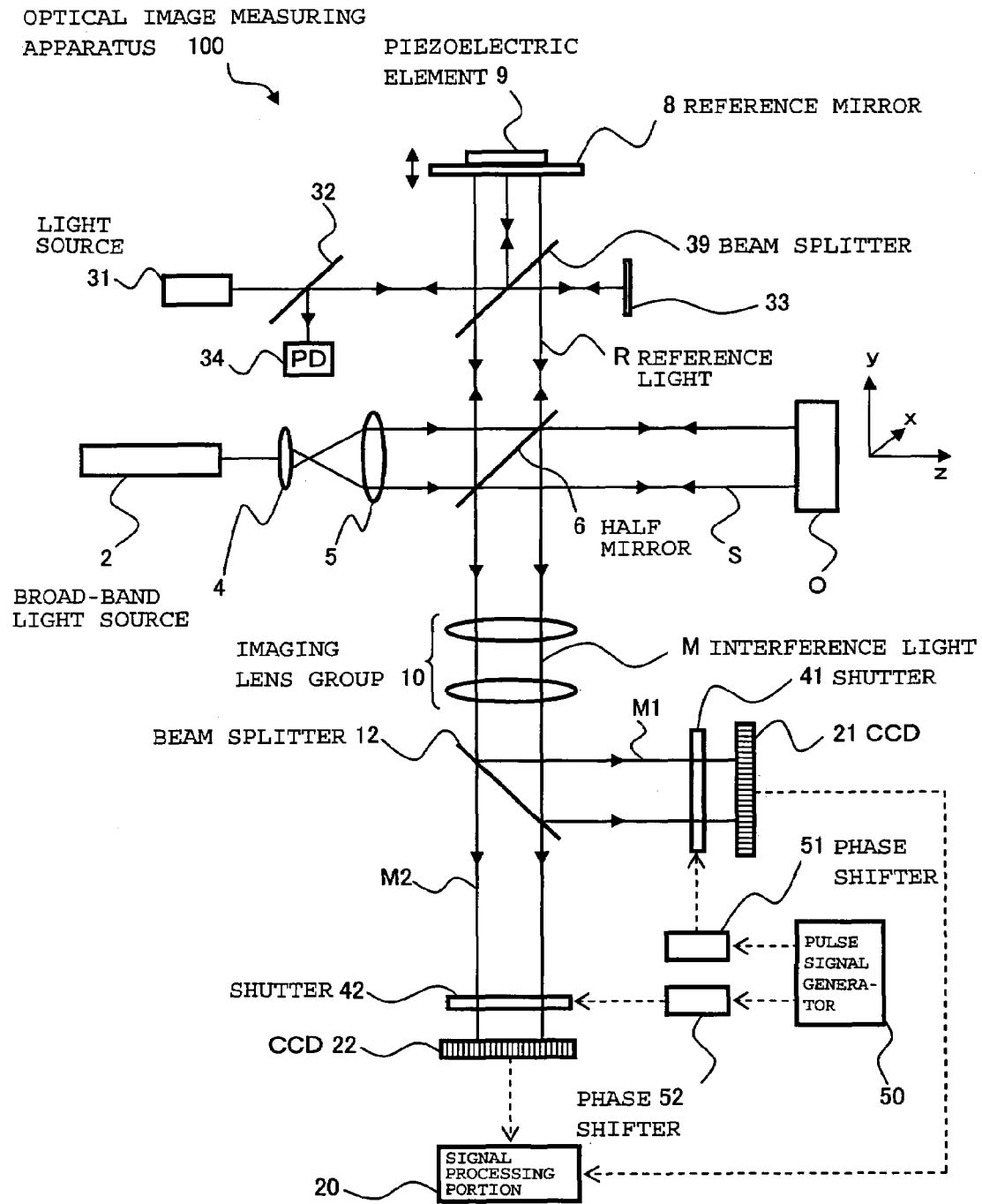
FIG. 5 is a schematic diagram showing an example of an optical system of an optical image measuring apparatus according to a second embodiment of the present invention.
Figure 6:
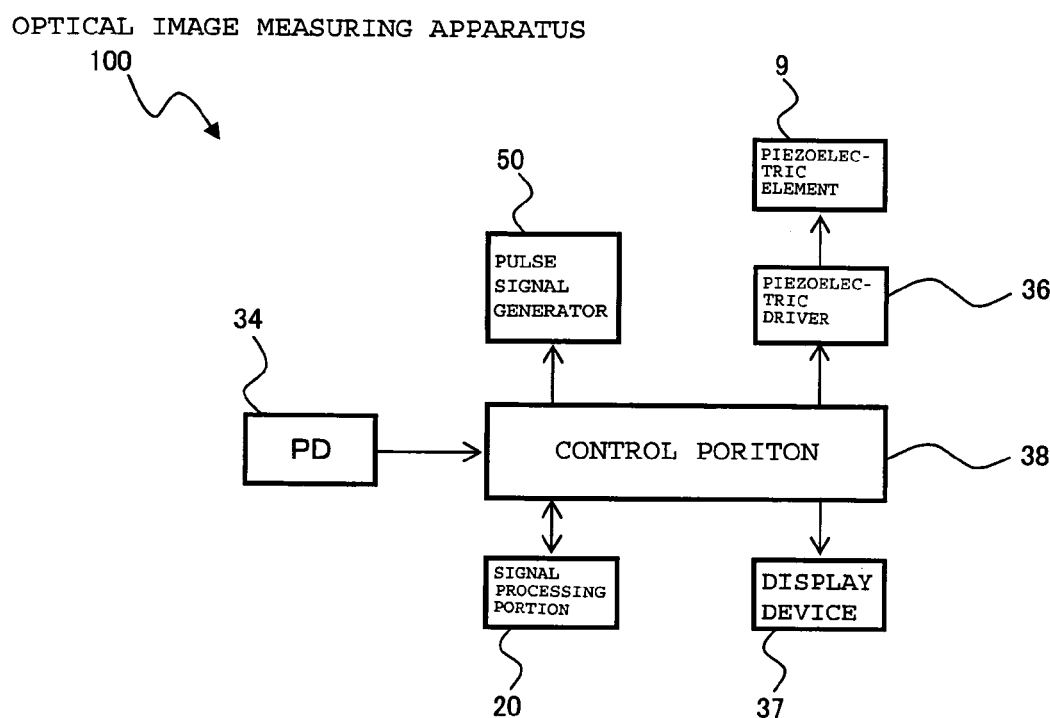
FIG. 6 is a schematic diagram showing an example of a control system of the optical image measuring apparatus according to the second embodiment of the present invention.

First, the optical image measuring apparatus according to this embodiment will be described. FIG. 5 shows (mainly) an optical system of the optical image measuring apparatus according to this embodiment and FIG. 6 shows a control system thereof. Hereinafter, the same references are provided to the same constituent portions as those in the first embodiment.

[Structure of Optical System]

As shown in FIG. 5, an optical image measuring apparatus 100 according to this embodiment includes the broadband light source 2 (light source), the lenses 4 and 5, the half mirror 6 (dividing means and superimposing means), the reference mirror 8 (reference object), and the piezoelectric element 9 (vibrating means). The light source 2 is composed of an SLD, a light emitting diode (LED), or the like and outputs a low-coherent continuous light beam. The lenses 4 and 5 convert a light beam from the light source 2 to a parallel light flux and increase a beam diameter thereof. The half mirror 6 divides the light beam into the signal light S and the reference light R and superimposes the signal light S and the reference light R on each other to produce interference light M. The reference mirror 8 is a total reflection mirror. The piezoelectric element 9 is used to perform the z-scanning of the reference mirror 8 and vibrate the reference mirror 8.

A frequency shifter composed of an optoelectronic modulator, an acoustooptic modulator, or the like may be provided on the optical path of the reference light R. More specifically, the frequency shifter may be provided immediately in front of the reference mirror 8.

The optical image measuring apparatus 100 further includes the imaging lens group 10, the beam splitter 12 (optical path dividing means), the CCDs (cameras) 21 and 22 (a set of detecting means), and shutters 41 and 42 (a set of intensity modulating means). The imaging lens group 10 images the interference light M produced by the half mirror 6. The beam splitter 12 divides the interference light M into two interference light beams M1 and M2. Each of the CCDs 21 and 22 is a storage type two-dimensional photo sensor array for interference light beam detection. The shutters 41 and 42 are disposed immediately in front of the CCDs 21 and 22 respectively and periodically cut off the interference light beams M1 and M2, respectively. Each of the shutters 41 and 42 is, for example, a high-speed shutter such as a liquid crystal shutter.

The shutters 41 and 42 are not necessarily disposed immediately in front of the CCDs 21 and 22, respectively. The shutters 41 and 42 can be disposed at arbitrary positions on respective optical paths joining branch points of the interference light beams M1 and M2 separated by the beam splitter 12 with the CCDs 21 and 22. That is, it is only necessary that the shutters 41 and 42 be disposed at positions in which the respective interference light beams M1 and M2 can be cut off or transmitted to change the quantities of light beams received by the CCDs 21 and 22 between 0 and 100.

The optical image measuring apparatus 100 further includes a pulse signal generator 50 and phase shifters 51 and 52. The pulse signal generator 50 generates pulse signals for shutter driving. The phase shifters 51 and 52 shift the phases of the pulse signals generated by the pulse signal generator 50 and output the pulse signals whose phases are shifted to each other to the shutters 41 and 42. The shutters 41 and 42 separately cut off or transmit the interference light beams M1 and M2, respectively, in response to the pulse signals from the phase shifters 51 and 52 as timing signals.

The shutters 41 and 42 periodically cut off the interference light beams M1 and M2 at a predetermined frequency, respectively, in response to the timing signals from the phase shifters 51 and 52 to sample the respective interference light beams M1 and M2. Therefore, the CCDs 21 and 22 periodically receive the corresponding interference light beams M1 and M2, perform photoelectric conversion thereon, and output heterodyne signals which are results obtained by the conversion to the signal processing portion 20. As in the first embodiment, the signal processing portion 20 (signal processing means) performs calculation processing described later to form an image of the object to be measured O.

The phase shifters 51 and 52 apply a predetermined phase difference between the open-and-close operations of the shutters 41 and 42. The phase difference may be, for example, 90° ($\pi/2$) as in the first embodiment or 180° ($\pi$) (can be arbitrarily set). Therefore, it is unnecessary to provide the phase shifter in front of each of the shutters 41 and 42. The phase shifter may be provided only in front of one of the shutters 41 and 42. For example, the phase shifter can be disposed in front of not the shutter 41 but the shutter 42.

The pulse signal generator 50 composes "pulse signal generating means" in the present invention. The phase shifters 51 and 52 compose "phase shifting means" in the present invention. The shutters 41 and 42 compose "shutter means" in the present invention.

A beam diameter of a light beam emitted from the light source 2 is increased by the lenses 4 and 5. Then, the light beam is divided into the signal light S and the reference light R by the half mirror 6. The signal light S is incident on the object to be measured O and then incident on the half mirror 6 again as a reflection light wave including information related to a surface form and an inner form of the object to be measured O.

On the other hand, the frequency of the reference light R is shifted by the z-scanning of the reference mirror 8 using the piezoelectric element 9. The reference light R whose frequency is shifted is incident on the half mirror 6 again.

A part of the signal light S from the object to be measured O is reflected on the half mirror 6. Simultaneously, a part of the reference light R which is subjected to the frequency shift passes through the half mirror 6. Therefore, the signal light S and the reference light R are superimposed on each other to produce the interference light M. The interference light M passes through the imaging lens group 10 and propagates to the beam splitter 12.

An optical path of the interference light M is divided into two by the beam splitter 12. The interference light beam M1 reflected on the beam splitter 12 is detected by the CCD 21 through the shutter 41. The interference light beam M2 transmitting through the beam splitter 12 is detected by the CCD 22 through the shutter 42.

It is desirable that a division ratio between the interference light beams separated by the beam splitter 12, that is, an intensity ratio between the reflected interference light beam M1 and the transmitted interference light beam M2 be 1:1. Therefore, the intensity levels of the interference light beams M1 and M2 detected by the CCDs 21 and 22 are made equal to each other. This is suitable to perform the calculation processing described later. An intensity ratio between the separated interference light beams is not limited to this and thus can be set as appropriate.

The optical image measuring apparatus 100 further includes the light source 31 (laser light source), the beam splitter 32, a beam splitter 39, and the photodetector (PD) 34 (auxiliary detection means). The light source 31 is composed of, for example, a laser diode and emits laser light. The beam splitter 32 transmits a part of the laser light from the light source 31. The beam splitter 39 divides the part of the laser light passing through the beam splitter 32 into a laser light beam propagating to the reference mirror 8 on an optical path and a laser light beam propagating to the reflecting mirror 33 on an optical path. Then, the beam splitter 39 superimposes the laser light beams which have propagated on the optical paths on each other to produce interference light (assistant interference light). The photo detector 34 detects the interference light. A distance between the beam splitter 39 and the reference mirror 8 and a distance between the beam splitter 39 and the reflecting mirror 33 are set such that the distances are substantially equal to each other.

The part of the laser light outputted from the light source 31 passes through the beam splitter 32 and then is divided by the beam splitter 39 into laser light propagating an optical path in a reference mirror 8 direction (first laser light) and laser light propagating on an optical path in a reflecting mirror 33 direction (second laser light).

The first laser light propagating the optical path in the reference mirror 8 direction is subjected to frequency shift when the first laser light is reflected on the reference mirror 8 during z-scanning and then incident on the beam splitter 39 again. At this time, the amount of shift of the frequency shift applied to the first laser light becomes equal to the amount of shift of the frequency shift applied to the reference light R.

On the other hand, the second laser light propagating the optical path in the reflecting mirror 33 direction is reflected on the reflecting mirror 33 and then incident on the beam splitter 39 again.

A part of the first laser light which is reflected on the reference mirror 8 is reflected on the beam splitter 39 and propagates to the beam splitter 32. A part of the second laser light which is reflected on the reflecting mirror 33 passes through the beam splitter 39 and propagates to the beam splitter 32. At this time, both the first laser light and the second laser light are superimposed on each other by the beam splitter 39 to produce the assistant interference light. The assistant interference light has a frequency equal to that of the interference light M.

A part of the assistant interference light produced by the beam splitter 39 is reflected on the beam splitter 32 and received by the photodetector 34. The photodetector 34 outputs an electrical signal corresponding to the received part of the assistant interference light. The electrical signal has a direct current component and an alternating current component as in the case of the heterodyne signal expressed by the expression (1). As described above, a frequency of the alternating current component is equal to the beat frequency of the interference light M.

[Structure of Control System]

Next, the control system of the optical image measuring apparatus 100 according to this embodiment will be described with reference to FIG. 6. The control system of the optical image measuring apparatus 100 includes a piezoelectric driver 36 for driving the piezoelectric element 9, a display device 37 for displaying an image, and a control portion 38 for controlling respective portions of the apparatus. A detection signal from the photo detector 34 and an image (image signal) formed by the signal processing portion 20 are inputted to the control portion 38.

The piezoelectric driver 36 composes "vibration control means" in the present invention, and operates to generate an electrical signal which has a frequency (for example, a frequency equal to that of the electrical signal) synchronized with the electrical signal outputted from the photo detector 34 and an amplitude in which the amplitude of vibration of the piezoelectric element 9 becomes ½ of the wavelength of the electrical signal and to output the generated electrical signal to the piezoelectric element 9 under the control of the control portion 38. Assume that a relationship between the amplitude of the electrical signal sent to the piezoelectric element 9 and the amplitude of vibration of the piezoelectric element 9 is known. The piezoelectric driver 36 outputs the electrical signal having the amplitude obtained from the relationship to the piezoelectric element 9. Therefore, the reference mirror 8 is vibrated at a frequency synchronized with the frequency of the interference light L with a longitudinal movement equal to ½ of the wavelength of the interference light M.

The display device 37 is composed of a monitor device such as a liquid crystal display or a CRT display and displays an image based on an image signal outputted from the control portion 38.

The control portion 38 is connected with the pulse signal generator 50 for generating the pulse signals for driving the shutters 41 and 42. The pulse signal generator 50 generates the pulse signals each having a frequency synchronized with the electrical signal outputted from the photo detector 34 (for example, a frequency equal to that of the electrical signal) under the control of the control portion 38 and outputs the generated pulse signals to the phase shifters 51 and 52. The phase shifters 51 and 52 shift the phases of the pulse signals relative to each other and output the pulse signals whose phases are shifted relative to each other to the shutters 41 and 42. The shutters 41 and 42 are driven based on the pulse signals whose phases are shifted relative to each other and repeat the open-and-close operation at a frequency equal to that of each of the pulse signals. Therefore, the CCDs 21 and 22 receive the interference light beams M1 and M2 at the frequency synchronized with the frequency of the interference light M.

[Measurement Mode]

Subsequently, a measurement mode of the interference light M obtained by the optical image measuring apparatus 100 according to this embodiment will be described.

First, an operator turns on a power source of the optical image measuring apparatus 100 and places the object to be measured O at a predetermined measurement position (position of the object to be measured O as shown in FIG. 5). When predetermined operation for starting measurement is performed, a light beam is emitted from the light source 2 and laser light is emitted from the light source 31.

The laser light emitted from the light source 31 is divided by the beam splitter 39 into a laser light beam propagating in the reference mirror 8 direction and a laser light beam propagating in the reflecting mirror 33 direction. The laser light beams are superimposed on each other to produce assistant interference light. The assistant interference light is received by the photo detector 34. The photo detector 34 outputs an electrical signal having a frequency synchronized with the frequency of the received assistant interference light.

The pulse signal generator 50 generates pulse signals each having a frequency synchronized with the electrical signal from the photo detector 34 and outputs the generated pulse signals to the phase shifters 51 and 52. The phase shifters 51 and 52 shift the phases of the pulse signals relative to each other and output the pulse signals whose phases are shifted relative to each other to the shutters 41 and 42. The shutters 41 and 42 each switch between open operation and close operation at the frequency of the pulse signals.

The piezoelectric driver 36 generates an electrical signal which has a frequency synchronized with the electrical signal from the photo detector 34 and an amplitude in which the amplitude of vibration of the piezoelectric element 9 becomes ½ of the wavelength of the electrical signal and outputs the generated electrical signal to the piezoelectric element 9. Therefore, the reference mirror 8 is vibrated by the piezoelectric element 9 at the frequency synchronized with the frequency of the interference light L with a longitudinal movement equal to ½ of the wavelength of the interference light L.

As described above, in this embodiment, the amount of shift of the frequency shift which is applied to the reference light R is monitored. The shutters 41 and 42 are opened and closed at a frequency synchronized with the amount of shift (=the frequency of the interference light L) to sample the interference light beams M1 and M2. In addition, the reference mirror 8 is vibrated at the frequency synchronized with the interference light L with a longitudinal movement equal to ½ of the wavelength of the interference light L.

A sampling function $m_1(t)$ for controlling the open-and-close timings of the shutter 41 is composed of, for example, a signal train of a rectangular wave with a duty of 50%. When the center wavelength of the laser light from the light source 31 is substantially equal to that of the light beam from the light source 2, a frequency (sampling frequency) $f_{sm}$ of the sampling function $m_1(t)$ becomes a value equal to or close to the beat frequency $f_{if}$ indicated in the expression (1) (that is, $f_{sm}=f_{if}$ or $f_{sm}\approx f_{if}$). A difference between the frequency $f_m$ of the sampling function $m_1(t)$ and the beat frequency $f_{if}$ of the heterodyne signal which is indicated in the expression (1) is expressed by ($\delta f=|f_{if}-f_{sm}|$). The difference $\delta f$ is set to a value sufficiently smaller than a response frequency of the CCD 21. Therefore, a part of the interference light beam M1 having substantially the same phase is sampled during each period thereof. At this time, an output $i_1(t)$ from the CCD 21 that receives the interference light beam M1 is proportional to the amount of photocharge stored in the CCD 21 during a measurement period. More specifically, the output $i_1(t)$ is expressed by the following expression (for example, see M. Akiba, K. P. Chan, and N. Tanno, Optics Letters, Vol. 28, 816 (2003)).

$$i_1(t) = \langle K_1 i(t) m_1(t) \rangle \qquad (16)$$

$$= K_1 \left[ \frac{1}{2} I_s + \frac{1}{2} I_r + \frac{2}{\pi} \sqrt{I_s I_r} \cos(2\pi \delta f t + \phi) \right]$$

Here, <-> indicates a time average produced by a storage effect of the CCD 21. In addition, $\phi$ indicates an initial phase value for measurement and $K_1$ indicates photo detection efficiency including reflectance of the beam splitter 12 and a photoelectric conversion rate of the CCD 21.

Similarly, the interference light beam M2 is sampled by the shutter 42 whose open-and-close timings are controlled using a sampling function $m_2(t)$ based on the pulse signal outputted from the pulse signal generator 50 at the frequency $f_{sm}$. The interference light beam M2 which is sampled by the shutter 42 is detected by the CCD 22. The sampling function $m_2(t)$ has a waveform of a rectangular train with a duty of 50% and a frequency $f_{sm}$ thereof is equal to that of the sampling function $m_1(t)$ for sampling the interference light beam M1. The sampling function $m_2(t)$ has a phase difference $\Delta\theta_{1,2}$ (for example, 180° or 90°) with the sampling function $m_1(t)$. The phase difference $\Delta\theta_{1,2}$ is produced by setting the amount of phase shifts applied by the phase shifters 51 and 52 in advance. Under the above-mentioned condition, the following output $i_2(t)$ is obtained from the CCD 22 based on the same fundamentals as the expression (16).

$$i_2 = K_2 \left[ \frac{1}{2} I_s + \frac{1}{2} I_r + \frac{2}{\pi} \sqrt{I_s I_r} \cos(2\pi \delta f t + \phi + \Delta\theta_{1,2}) \right] \qquad (17)$$

Here, $K_2$ indicates photo detection efficiency including transmittance of the beam splitter 12 and a photoelectric conversion rate of the CCD 22.

As is apparent from the expressions (16) and (17), each of the outputs from the CCDs 21 and 22 includes the term of an intensity $I_s$ of the signal light S and the term of an intensity $I_r$ of the reference light R. In addition, the output from the CCD 21 includes the term related to an amplitude $\sqrt{(I_s I_r)}$ of the interference light beam M1 and a phase $(2\pi\delta ft+\phi)$ thereof. The output from the CCD 22 includes the term related to an amplitude $\sqrt{(I_s I_r)}$ of the interference light beam M2 and a phase $(2\pi\delta ft+\phi+\Delta\theta_{1,2})$ thereof.

Figure 7A:
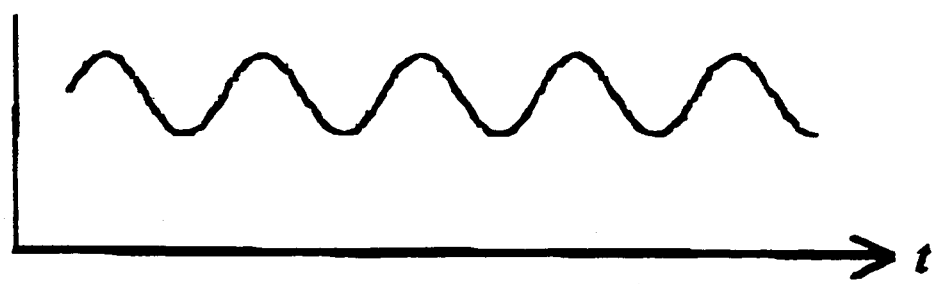
Figure 7B:
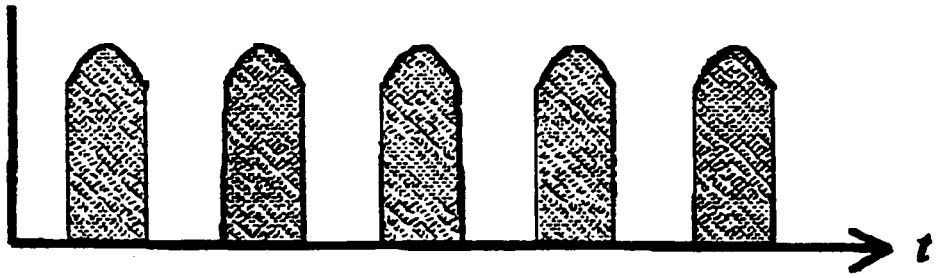
Figure 7C:
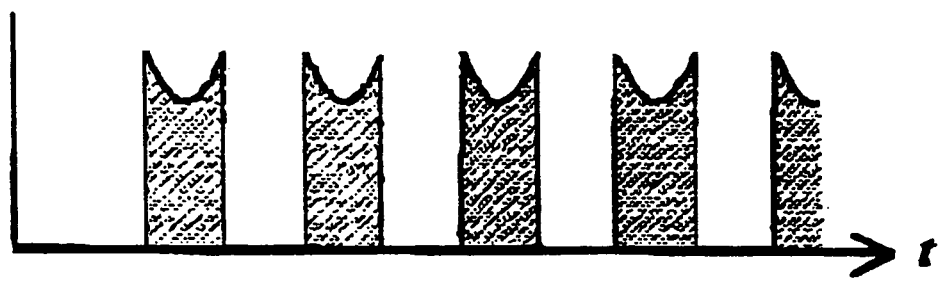
Figure 8:
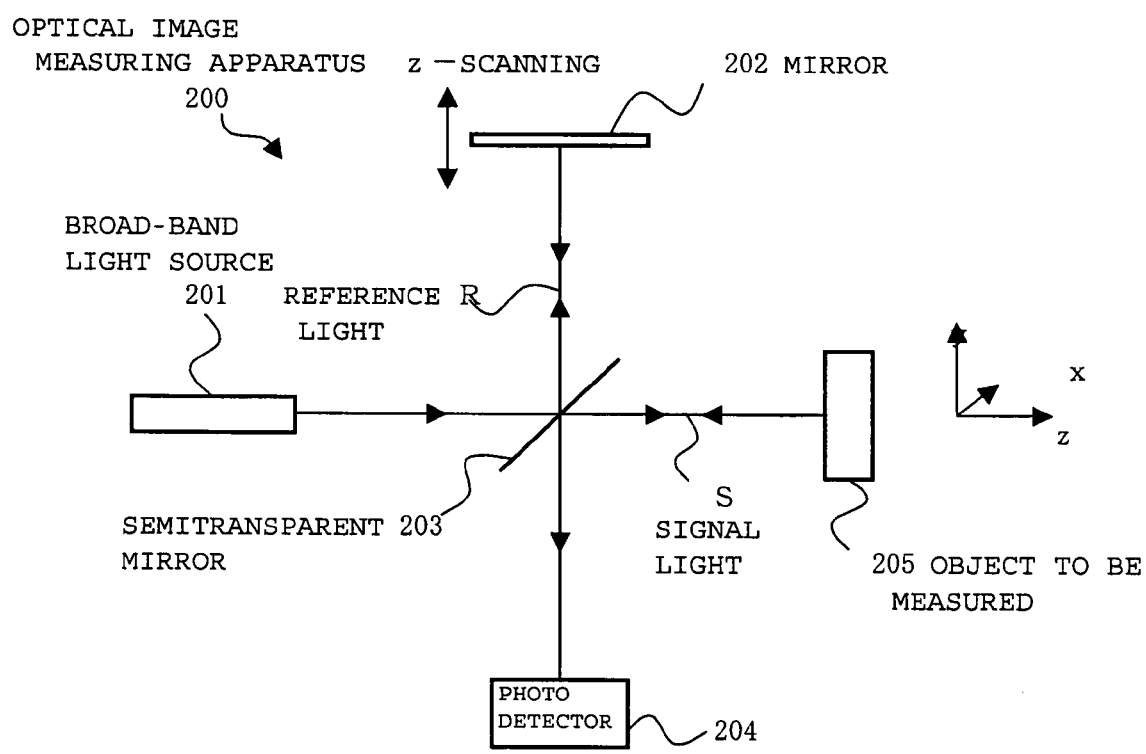
FIG. 8 is a schematic diagram showing a conventional optical image measuring apparatus.
Figure 9:
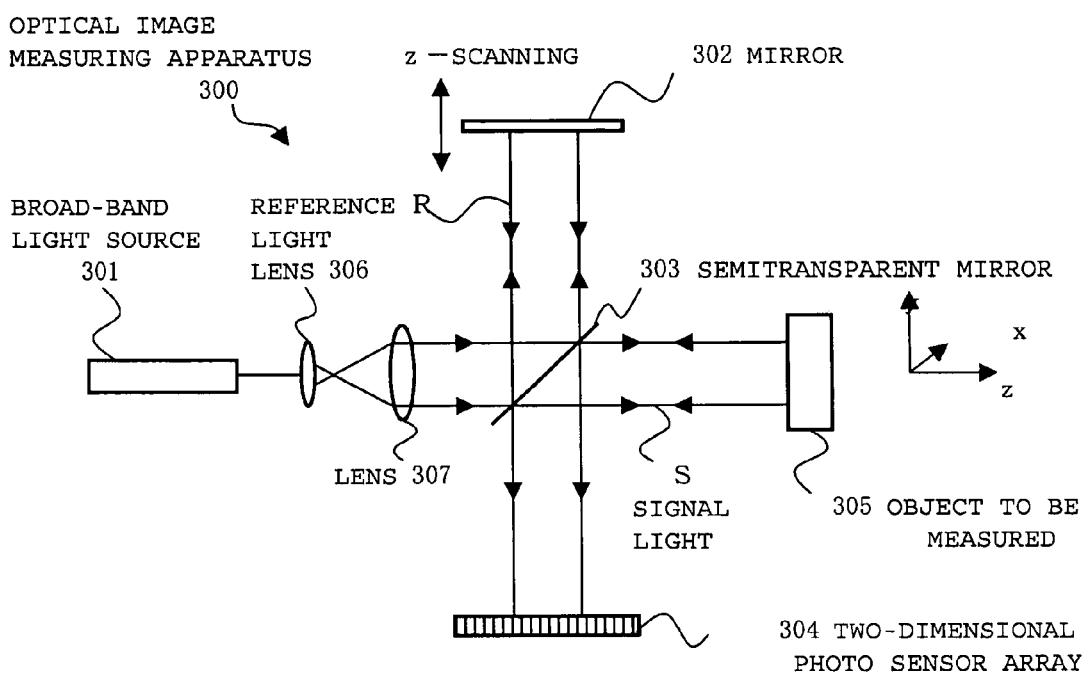
FIG. 9 is a schematic diagram showing a conventional optical image measuring apparatus.

FIGS. 7A to 7C are explanatory diagrams showing sampling operations of the interference light beams M1 and M2 which are performed by the shutters 41 and 42 in the case where the phase difference $\Delta\theta_{1,2}$ between the sampling functions $m_1(t)$ and $m_2(t)$ with the duty of 50% is set to 180° ($\pi$). FIG. 7A shows a temporal waveform of the interference light M. FIG. 7B shows a temporal waveform of the interference light beam M1 received by the CCD 21 through the shutter 41. FIG. 7C shows a temporal waveform of the interference light beam M2 received by the CCD 22 through the shutter 42.

As is apparent from FIGS. 7A to 7C, when the phase of the interference light M is 0°, the shutter 41 is opened. In addition, when the phase of the interference light M is 180°, the shutter 41 is closed. Therefore, a part of the interference light beam M1 (interference light M) corresponding to a phase range of 0° to 180° is detected by the CCD 21. On the other hand, when the phase of the interference light M is 180°, the shutter 42 is opened. In addition, when the phase of the interference light M is 360° (=0°), the shutter 42 is closed. Therefore, apart of the interference light beam M2 (interference light M) corresponding to a phase range of 180° to 360° is detected by the CCD 22.

In order to obtain a high-precision image, as shown in FIG. 7B, it is preferable that part of the interference light beam M1 detected by the CCD 21 include a "peak" part of the interference light beam M1, that is, a part in which the intensity thereof is maximum. In addition, as shown in FIG. 7C, it is preferable that part of the interference light beam M2 detected by the CCD 22 include a "valley" part of the interference light beam M2, that is, a part in which the intensity thereof is minimum. In contrast to this, a "valley" part of the interference light beam M1 and a "peak" part of the interference light beam M2 may be detected.

The signal processing portion 20 calculates a spatial signal intensity distribution of the interference light M or a spatial phase distribution thereof based on a result obtained by detection of each of the CCDs 21 and 22 to form images. Then, the signal processing portion 20 subtracts the images from each other to produce an image indicating the spatial signal intensity distribution of the interference light M or the spatial phase distribution thereof, that is, an image indicating a surface structure of the object to be measured ○ or an inner structure thereof. The produced image is outputted as an image signal from the control portion 38 to the display device 37 and displayed thereon.

[Operation and Effect]

According to the optical image measuring apparatus 100 in this embodiment, the alternating current component of the interference light M can be obtained by a smaller number of (two) CCDs than the number of CCDs in a conventional case. Because the open-and close timings of the shutters 41 and 42 and the frequency and amplitude of vibration of the reference mirror 8 are automatically set, the interference light M can be easily sampled with high precision.

OTHER MODIFIED EXAMPLES

The above-mentioned detailed embodiments are merely construction examples of the optical image measuring apparatus according to the present invention. Therefore, arbitrary modifications can be made without departing from the spirit of the present invention.

For example, the method of modulating the intensity of the light beam in the first embodiment is not limited to the above-mentioned method involving pulse-driving the light source and the above-mentioned method involving periodically cutting off the light beam using the shutter and thus an arbitrary method can be applied. For example, the intensity of the light beam can be modulated by periodically inserting or removing a neutral density filter onto or from the optical path of the light beam.

An arbitrary structure instead of the piezoelectric element can be applied to vibrate the reference object.

In the first embodiment, it is only necessary that the frequency of the intensity modulation of the light beam be synchronized with the frequency of the interference light. Therefore, an arbitrary structure can be employed to realize the synchronization. Similarly, in the second embodiment, it is only necessary that the frequency of the intensity modulation of the interference light beam which is performed by the intensity modulating means (shutter) be synchronized with the frequency of the interference light. Therefore, an arbitrary structure can be employed to realize the synchronization. For example, when an optical image measuring apparatus in which the frequency of the interference light (relative frequency difference between the signal light and the reference light) is always maintained constant is constructed, it is possible to set an intensity modulation frequency of each of the light beam and the interference light beam to a predetermined value.

In the first and second embodiments, it is only necessary that the frequency of vibration of the reference object which is caused by the vibrating means (piezoelectric element) be synchronized with the frequency of the interference light and the longitudinal movement thereof be set to be equal to or smaller than the wavelength of the interference light. A structure for realizing such a state is arbitrary. For example, when the optical image measuring apparatus in which the frequency of the interference light (relative frequency difference between the signal light and the reference light) is always maintained constant is constructed, it is possible to set each of the frequency of vibration of the reference object which is caused by the vibrating means and the longitudinal movement thereof to a predetermined value.

What is claimed is:

1. An optical image measuring apparatus, comprising:
light beam outputting means for outputting a light beam whose intensity is periodically modulated;
dividing means for dividing the light beam into signal light propagating through an object to be measured and reference light propagating through a reference object;
vibrating means for vibrating the reference object at a predetermined frequency with a predetermined amplitude;
converting means for converting a polarization characteristic of one of the signal light and the reference light;
superimposing means for superimposing the signal light propagating through the object to be measured and the reference light propagating through the reference object to be vibrated on each other to produce interference light, the signal light and the reference light respectively having a polarization characteristic converted by the converting means;
extracting means for extracting two different polarized light components from the produced interference light by the superimposing means;
two detecting means for detecting the two different polarized light components that have been extracted from the first interference;
signal processing means for calculating one of a signal intensity and a phase of the interference light based on the polarized light components detected by the two detecting means to form an image of the object to be measured; and
a controller configured to synchronize the predetermined frequency related to vibration of the reference object which is caused by the vibrating means with the frequency of the interference light, and to set the predetermined amplitude of the vibration to be equal to or smaller than the wavelength of the interference light.

2. An optical image measuring apparatus according to claim 1, wherein the vibrating means comprises a piezoelectric element bonded to the reference object.

3. An optical image measuring apparatus according to claim 2, further comprising:
   a laser light source for outputting laser light;
   an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light;
   assistant detection means for detecting the produced assistant interference light; and
   vibration control means for controlling the vibrating means based on a result obtained by detection of the assistant detection means.

4. An optical image measuring apparatus according to claim 3, wherein the predetermined amplitude related to the vibration of the reference object which is caused by the vibrating means is set to 1/10 of a wavelength of the interference light to the wavelength thereof.

5. An optical image measuring apparatus according to claim 2, wherein the predetermined amplitude related to the vibration of the reference object which is caused by the vibrating means is set to 1/10 of a wavelength of the interference light to the wavelength thereof.

6. An optical image measuring apparatus according to claim 1, further comprising:
   a laser light source for outputting laser light;
   an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light;
   assistant detection means for detecting the produced assistant interference light; and
   vibration control means for controlling the vibrating means based on a result obtained by detection of the assistant detection means.

7. An optical image measuring apparatus according to claim 6, wherein the predetermined amplitude related to the vibration of the reference object which is caused by the vibrating means is set to 1/10 of a wavelength of the interference light to the wavelength thereof.

8. An optical image measuring apparatus according to claim 1, wherein the predetermined amplitude related to the vibration of the reference object which is caused by the vibrating means is set to 1/10 of a wavelength of the interference light to the wavelength thereof.

9. An optical image measuring apparatus according to claim 1, wherein the light beam outputting means comprises:
   a light source for emitting the light beam; and
   light source driving means for driving the light source to periodically output the light beam at a predetermined phase difference with a frequency synchronized with the frequency of the interference light.

10. An optical image measuring apparatus according to claim 9, further comprising:
    a laser light source for outputting laser light;
    an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and
    assistant detection means for detecting the produced assistant interference light,
    wherein the light source driving means of the light beam outputting means generates a pulse signal having a frequency synchronized with a frequency of the assistant interference light based on a result obtained by detection of the assistant detection means, and
    the light source is driven based on the generated pulse signal and outputs a pulsed light beam having a frequency equal to a frequency of the pulse signal.

11. An optical image measuring apparatus according to claim 1, wherein the light beam outputting means comprises:
    a light source for outputting a continuous light beam; and
    light beam cutoff means for periodically cutting off the outputted continuous light beam at a frequency synchronized with the frequency of the interference light.

12. An optical image measuring apparatus according to claim 11, further comprising:
    a laser light source for outputting laser light;
    an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and
    assistant detection means for detecting the produced assistant interference light,
    wherein the light beam cutoff means periodically cuts off the continuous light beam based on a result obtained by detection of the assistant detection means.

13. An optical image measuring apparatus according to claim 1, wherein the first converting means comprises a polarizing plate for transmitting an oscillation component of the light beam in a predetermined direction.

14. An optical image measuring apparatus according to claim 1, wherein the second converting means comprises a wavelength plate for applying a phase difference between a P-polarized light component and an S-polarized light component of the one of the signal light and the reference light, which is the linearly polarized light, to convert the polarization characteristic thereof, the P-polarized light component and the S-polarized light component being orthogonal to each other.

15. An optical image measuring apparatus according to claim 14, wherein the extracting means comprises a polarization beam splitter for transmitting a P-polarized light component of the interference light and reflecting an S-polarized light component thereof.

16. An optical image measuring apparatus, comprising:
    a light source for emitting a light beam;
    dividing means for dividing the emitted light beam into signal light propagating through an object to be measured and reference light propagating through a reference object;

vibrating means for vibrating the reference object at a predetermined frequency with a predetermined amplitude;

superimposing means for superimposing the signal light which has propagated through the object to be measured and the reference light which has propagated through the reference object on each other to produce interference light;

optical path dividing means for dividing an optical path of the produced interference light into two optical paths;

two intensity modulating means for periodically modulating intensities of interference light beams propagating on the optical paths at a predetermined frequency;

two detecting means for detecting the interference light beams whose intensities are modulated by the two intensity modulating means and which propagate on the optical paths;

signal processing means for calculating one of a signal intensity and a phase of each of the interference light beams detected by the two detecting means to form an image of the object to be measured; and a controller configured to synchronize the predetermined frequency for intensity modulation of the interference light beams which is performed by the two intensity modulating means with a frequency of the interference light, to synchronize the predetermined frequency related to vibration of the reference object which is caused by the vibrating means with the frequency of the interference light and to set the predetermined amplitude of the vibration to be equal to or smaller than a wavelength of the interference light.

17. An optical image measuring apparatus according to claim 16, wherein the vibrating means comprises a piezoelectric element bonded to the reference object.

18. An optical image measuring apparatus according to claim 17, further comprising:

a laser light source for outputting laser light;

an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light;

assistant detection means for detecting the produced assistant interference light; and vibration control means for controlling the vibrating means based on a result obtained by detection of the assistant detection means.

19. An optical image measuring apparatus according to claim 18, wherein the predetermined amplitude related to the vibration of the reference object which is caused by the vibrating means is set to $1/10$ of a wavelength of the interference light to the wavelength thereof.

20. An optical image measuring apparatus according to claim 17, wherein the predetermined amplitude related to the vibration of the reference object which is caused by the vibrating means is set to $1/10$ of a wavelength of the interference light to the wavelength thereof.

21. An optical image measuring apparatus according to claim 16, further comprising:

a laser light source for outputting laser light;

an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light;

assistant detection means for detecting the produced assistant interference light; and vibration control means for controlling the vibrating means based on a result obtained by detection of the assistant detection means.

22. An optical image measuring apparatus according to claim 21, wherein the predetermined amplitude related to the vibration of the reference object which is caused by the vibrating means is set to $1/10$ of a wavelength of the interference light to the wavelength thereof.

23. An optical image measuring apparatus according to claim 16, wherein the predetermined amplitude related to the vibration of the reference object which is caused by the vibrating means is set to $1/10$ of a wavelength of the interference light to the wavelength thereof.

24. An optical image measuring apparatus according to claim 16, further comprising:

pulse signal generating means for outputting a pulse signal having a frequency synchronized with the frequency of the interference light; and phase shifting means for relatively shifting a phase of the outputted pulse signal to output pulse signals whose phases are shifted relative to each other to the two intensity modulating means, wherein the two intensity modulating means modulate the intensities of interference light beams based on the pulse signals whose phases are shifted relative to each other by the phase shifting means.

25. An optical image measuring apparatus according to claim 24, further comprising:

a laser light source for outputting laser light;

an interference optical system for dividing the outputted laser light into first laser light propagating through the vibrated reference object and second laser light propagating through a reflecting mirror which is fixedly located and superimposing the first laser light which has propagated through the reference object and the second laser light which has reflected on the reflecting mirror on each other to produce assistant interference light; and assistant detection means for detecting the produced assistant interference light, wherein the pulse signal generating means outputs the pulse signal having a frequency synchronized with a frequency of the assistant interference light based on a result obtained by detection of the assistant detection means.

26. An optical image measuring apparatus according to claim 16, wherein the two intensity modulating means comprise shutter means for periodically cutting off the interference light beams at the predetermined frequency.

* * * * *